United States Patent
Naruto et al.

(10) Patent No.: US 8,269,876 B2
(45) Date of Patent: Sep. 18, 2012

(54) DISPLAYING IMAGES SUBJECTED TO CHANGE OPERATIONS IN A PRIMARY AND A SECONDARY DISPLAY REGION

(75) Inventors: Hirokazu Naruto, Minato-ku (JP); Hisashi Tsugane, Minato-ku (JP)

(73) Assignee: Sony Corporation, Tokyo (JP)

( * ) Notice: Subject to any disclaimer, the term of this patent is extended or adjusted under 35 U.S.C. 154(b) by 415 days.

(21) Appl. No.: 12/522,314

(22) PCT Filed: Jul. 8, 2008

(86) PCT No.: PCT/JP2008/062324
§ 371 (c)(1),
(2), (4) Date: Jul. 7, 2009

(87) PCT Pub. No.: WO2009/031357
PCT Pub. Date: Mar. 12, 2009

(65) Prior Publication Data
US 2010/0073544 A1    Mar. 25, 2010

(30) Foreign Application Priority Data
Sep. 5, 2007  (JP) ................................ 2007-230206

(51) Int. Cl.
*H04N 5/222*  (2006.01)
*G06F 3/00*   (2006.01)
(52) U.S. Cl. .............. 348/333.05; 348/333.02; 715/730; 715/732; 715/722
(58) Field of Classification Search ............. 348/333.02, 348/333.05; 715/730, 715, 722
See application file for complete search history.

(56) References Cited

U.S. PATENT DOCUMENTS

| 6,883,140 B1 * | 4/2005 | Acker et al. .................. 715/730 |
| 2002/0027602 A1 * | 3/2002 | Ejima et al. .................. 348/232 |
| 2005/0216841 A1 | 9/2005 | Acker et al. |

(Continued)

FOREIGN PATENT DOCUMENTS

| JP | 2000 181427 | 6/2000 |
| JP | 2001-052191 | 2/2001 |
| JP | 2001 52191  | 2/2001 |

OTHER PUBLICATIONS

European Search Report issued Apr. 6, 2011, in Patent Application No. 08790961.0.

(Continued)

*Primary Examiner* — Jason Chan
*Assistant Examiner* — Joel Fosselman
(74) *Attorney, Agent, or Firm* — Oblon, Spivak, McClelland, Maier & Neustadt, L.L.P.

(57) ABSTRACT

An image-capturing device (image display device) 1 includes a rear monitor 12 (display means) having a primary display region MR and a plurality of secondary display regions SR1 to SR3. Further, display control means of the image-capturing device 1 controls contents of display on the rear monitor 12 so that a plurality of images are displayed in the plurality of secondary display regions SR1 to SR3 and so that an image P2 which is displayed in one secondary display region (for example, SR2) among the plurality of secondary display regions SR1 to SR3 is also displayed in the primary display region MR. Further, when a predetermined change (rotation, etc.) is carried out on the image P2, the image P2 in a state of being subjected to the predetermined change is displayed in both the one secondary display region SR2 among the plurality of secondary display regions SR1 to SR3 and the primary display region MR.

14 Claims, 21 Drawing Sheets

U.S. PATENT DOCUMENTS

2007/0033626 A1\* 2/2007 Yang et al. .................... 725/105

OTHER PUBLICATIONS

"Phase One Capture One DSLR Preview: Digital Photography Review", http://www.dpreview.com/news/0211/02110901captureonepreview.asp, XP 2336071, Nov. 11, 2002, 5 pages.

"Zoner Photo Studio 8—základní uživatelská příručka", Zoner Software, XP 2628092, Oct. 24, 2005, pp. 6-22.

Japanese Office Action issued May 24, 2012 in Japanese Application No. 2007-230206, pp. 4 pages.

European Office Action issued Jul. 6, 2012 in European Application No. 08 790 961.0-2202, pp. 4.

\* cited by examiner

DISPLAYING IMAGES SUBJECTED TO CHANGE OPERATIONS IN A PRIMARY AND A SECONDARY DISPLAY REGION

TECHNICAL FIELD

The present invention relates to an image display device that displays an image and to a technique related thereto.

BACKGROUND ART

Some image display devices exist that display a plurality of images on a display unit having a primary screen and a secondary screen.

For example, it is shown in Patent Document 1 that a plurality of images are displayed on a plurality of secondary screens and that an image selected from among the plurality of images is displayed so as to gradually move from a given secondary screen to a primary screen.

Patent Document 1: Japanese Unexamined Patent Application Publication No. 2000-181427

DISCLOSURE OF INVENTION

The technique mentioned above is intended to relate to a display technique for causing a given image to move from one secondary screen (also referred to as a secondary display region) to a primary screen (also referred to a primary display region), and is not intended to relate to other purposes. There is space for improvement of approaches to utilize a primary screen and secondary screens.

Accordingly, it is an object of this invention to provide an image display device capable of providing more useful display by utilizing a primary display region and a plurality of secondary display regions and a technique related thereto.

A first aspect of the present invention is an image display device, including display means having a primary display region and a plurality of secondary display regions, display control means that controls contents of display on the display means so that a plurality of images are displayed in the plurality of secondary display regions and so that a first image which is displayed in one secondary display region among the plurality of secondary display regions is also displayed in the primary display region, and change means that carries out a predetermined change on the first image, wherein the display control means displays the first image in a state of being subjected to the predetermined change in both the one secondary display region and the primary display region.

A second aspect of the present invention is an image-capturing device, including display means having a primary display region and a plurality of secondary display regions, display control means that controls contents of display on the display means so that a plurality of images are displayed in the plurality of secondary display regions and so that a first image which is displayed in one secondary display region among the plurality of secondary display regions is also displayed in the primary display region, and change means that carries out a predetermined change on the first image, wherein the display control means displays the first image in a state of being subjected to the predetermined change in both the one secondary display region and the primary display region.

A third aspect of the present invention is a program for causing a computer to execute a) a procedure of displaying, at display means having a primary display region and a plurality of secondary display regions, a plurality of images in the plurality of secondary display regions and displaying a first image which is displayed in one secondary display region among the plurality of secondary display regions also in the primary display region, b) a procedure of carrying out a predetermined change on the first image, and c) a procedure of updating and displaying the first image in a state of being subjected to the predetermined change in both the one secondary display region and the primary display region.

According to the present invention, a first image in a state of being subjected to a predetermined change is displayed in a relatively large size in a primary display region. This facilitates confirmation of the contents of the change. Further, the first image in the state of being subjected to the predetermined change is also displayed in one secondary display region among a plurality of secondary display regions. This allows confirmation of the predetermined change carried out on the first image among a plurality of images while performing comparison with remaining images.

BEST MODE FOR CARRYING OUT THE INVENTION

An embodiment of the present invention will be explained hereinafter based on the drawings.

<1. Structure>

Figure 1:
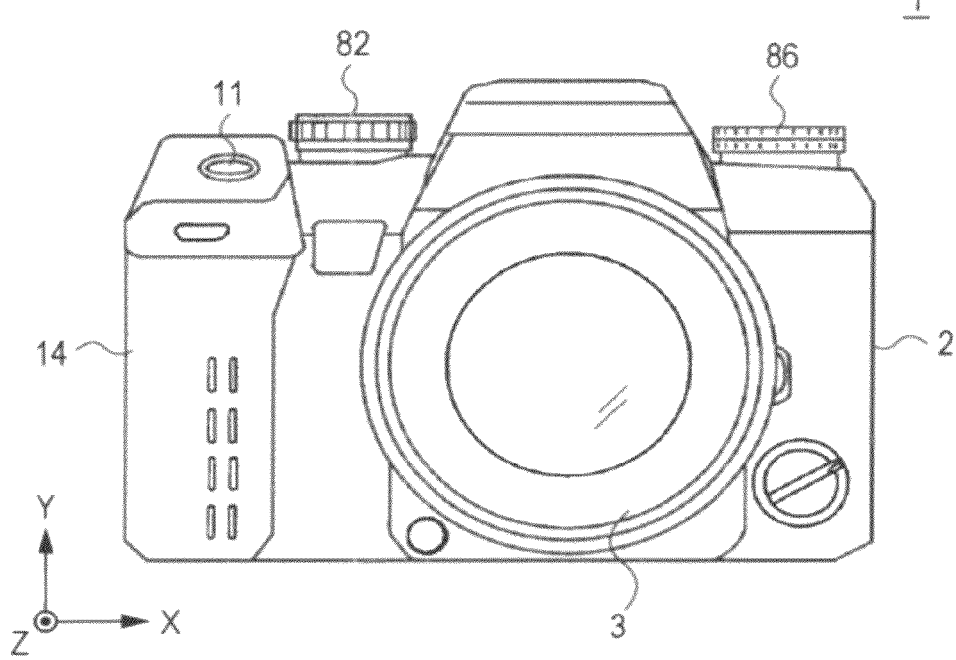
FIG. 1 is a front external view of an image-capturing device.
Figure 2:
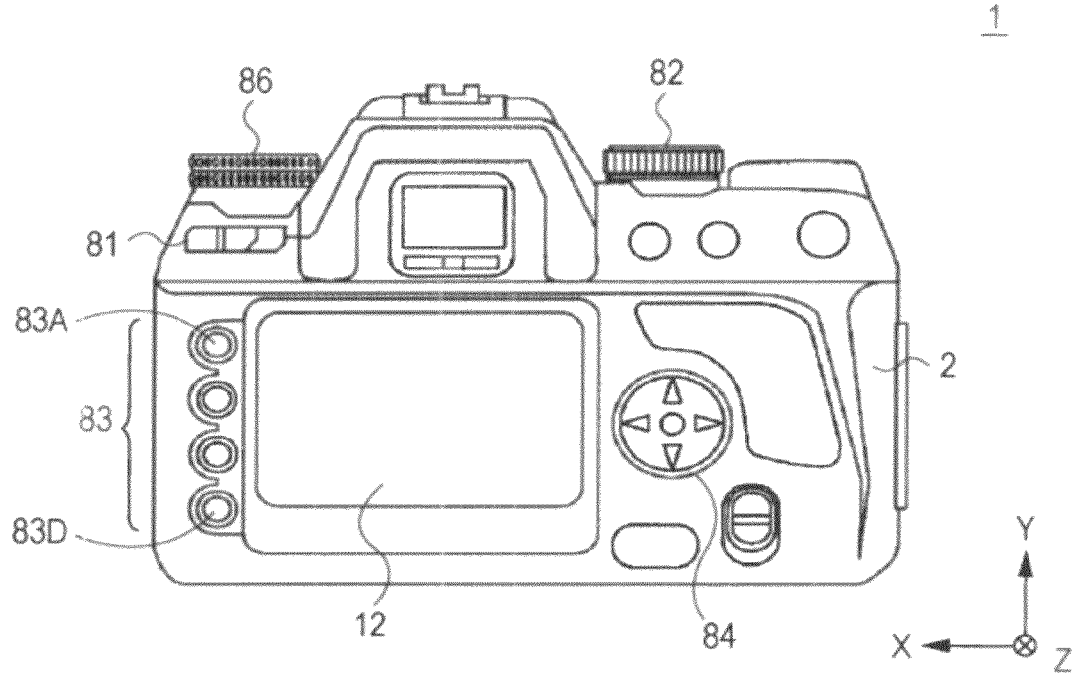
FIG. 2 is a rear external view of the image-capturing device.

FIGS. 1 and 2 are diagrams showing an external structure of an image-capturing device 1 according to the present invention. Here, FIG. 1 is a front external view of the image-capturing device 1, and FIG. 2 is a rear external view of the image-capturing device 1. The image-capturing device 1 is configured as an interchangeable-lens single-lens reflex type digital camera. Note that the image-capturing device 1 also functions as an image display device that displays an image on a rear monitor 12 (described below).

As shown in FIG. 1, the image-capturing device 1 includes a camera main body section (camera body) 2. An interchangeable photographing lens unit (interchangeable lens) 3 is removably attached to the camera main body section 2.

Further, the camera main body section 2 includes a mode setting dial 82 on an upper left portion as viewed from the front thereof, and a control value setting dial 86 on an upper right portion as viewed from the front thereof. According to the operation of the mode setting dial 82, an action of setting (action of switching) various camera modes (including various shooting modes (a portrait shooting mode, a landscape shooting mode, and a full automatic shooting mode, etc.), a playback mode in which a photographed image is played back, a communication mode in which data exchange with an external device is performed, etc.) can be performed. According to the operation of the control value setting dial 86, further, control values in various shooting modes can be set.

The camera main body section 2 further includes a grip section 14 to be held by a photographer on a left end portion as viewed from the front thereof. A release button 11 for instructing the start of exposure is provided on an upper surface of the grip section 14. A battery accommodating chamber and a card accommodating chamber are provided inside the grip section 14. For example, a lithium-ion battery as a power source of the camera is accommodated in the battery accommodating chamber, and a memory card 90 (see FIG. 3) for recording image data of a photographed image is removably accommodated in the card accommodating chamber.

In FIG. 2, the rear monitor 12 is provided substantially at the center on a rear surface of the camera main body section 2. The rear monitor 12 is configured as, for example, a color liquid crystal display (LCD). The rear monitor 12 is capable of displaying various menu screens, playing back and displaying a photographed image recorded on the memory card 90 (recording medium) in a playback mode, and so forth.

A main switch 81 is provided in an upper left portion of the rear monitor 12. The main switch 81 is composed of a two-position slide switch, where a contact is set to a left "OFF" position to thereby turn off the power supply and is set to an "ON" position on the right of the contact to thereby turn on the power supply.

Figure 4:
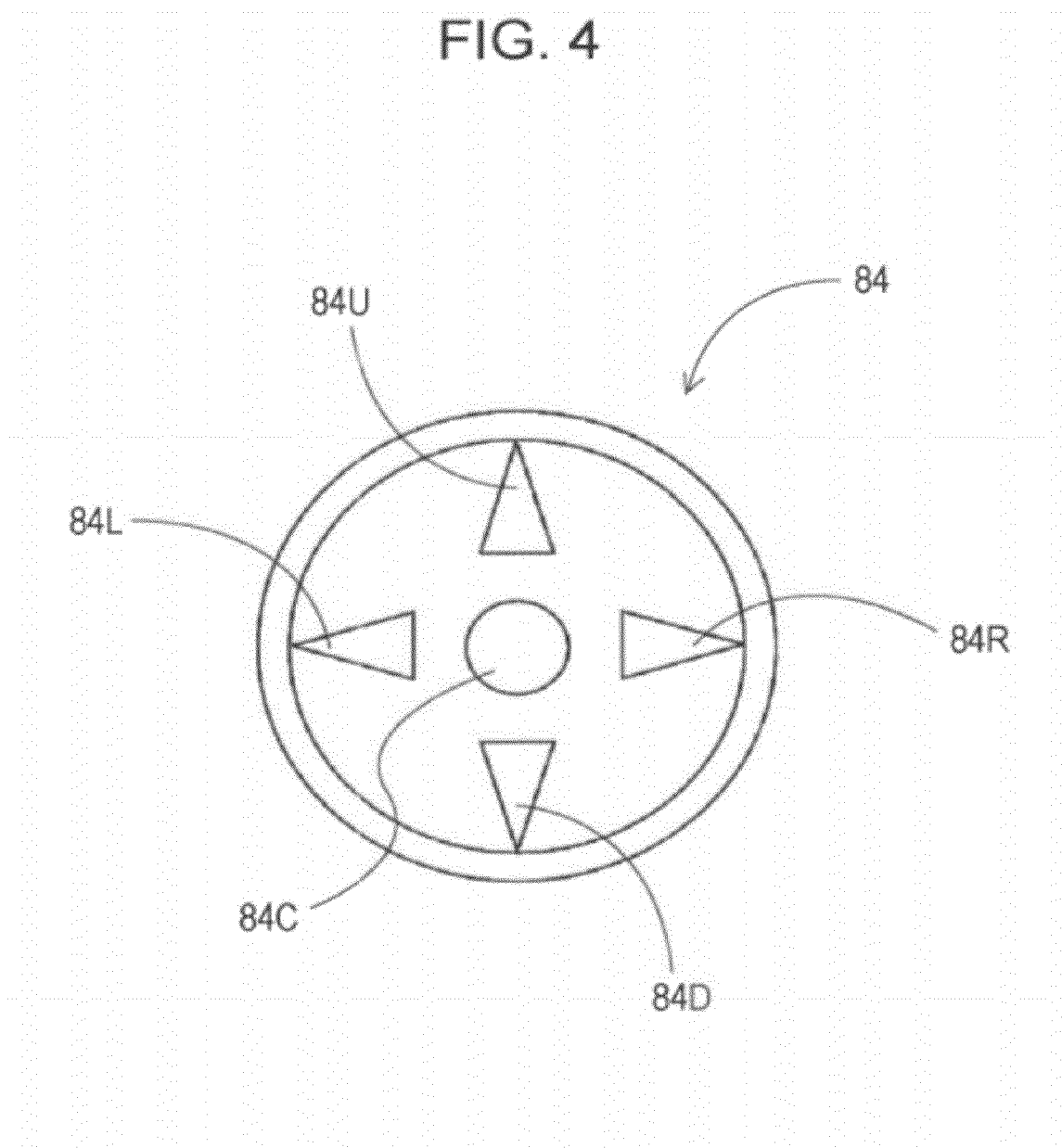
FIG. 4 is an enlarged view of a direction selection key.

A direction selection key 84 (see also FIG. 4) is provided on the right side of the rear monitor 12. The direction selection key 84 has an up button 84U, a down button 84D, a left button 84L, and a right button 84R, and is configured to allow detection of pressing operations in four directions: up, down, left, and right. The direction selection key 84 further has a center button 84C, and also allows detection of a pressing operation at the center portion besides the pressing operations in the four directions described above.

A setting button group 83 composed of a plurality of buttons for performing a setting of a menu screen, deletion of an image, and so forth is provided on the left side of the rear monitor 12. The setting button group 83 includes a menu button 83A and a shift button 83D.

<2. Functional Block>

Next, an overview of the functions of the image-capturing device 1 will be explained.

The image-capturing device 1 includes an image pickup element (CCD, etc.), and converts an optical image of a subject (subject image) from a photographing optical system into an electrical signal using the photoelectric conversion effect to generate an image signal according to the present photographed image (image signal for recording).

The image data according to the present photographed image is stored in the memory card 90 after appropriate image processing (including a compression process, etc.) is carried out.

Further, image data saved in the memory card 90 is read into the image-capturing device 1, and an image based on the image data is displayed on the rear monitor 12. That is, playback display for playing back an image that has been photographed, etc., is realized on the rear monitor 12 of the image-capturing device 1.

A playback function of the image-capturing device 1 will be mainly explained hereinafter.

Figure 3:
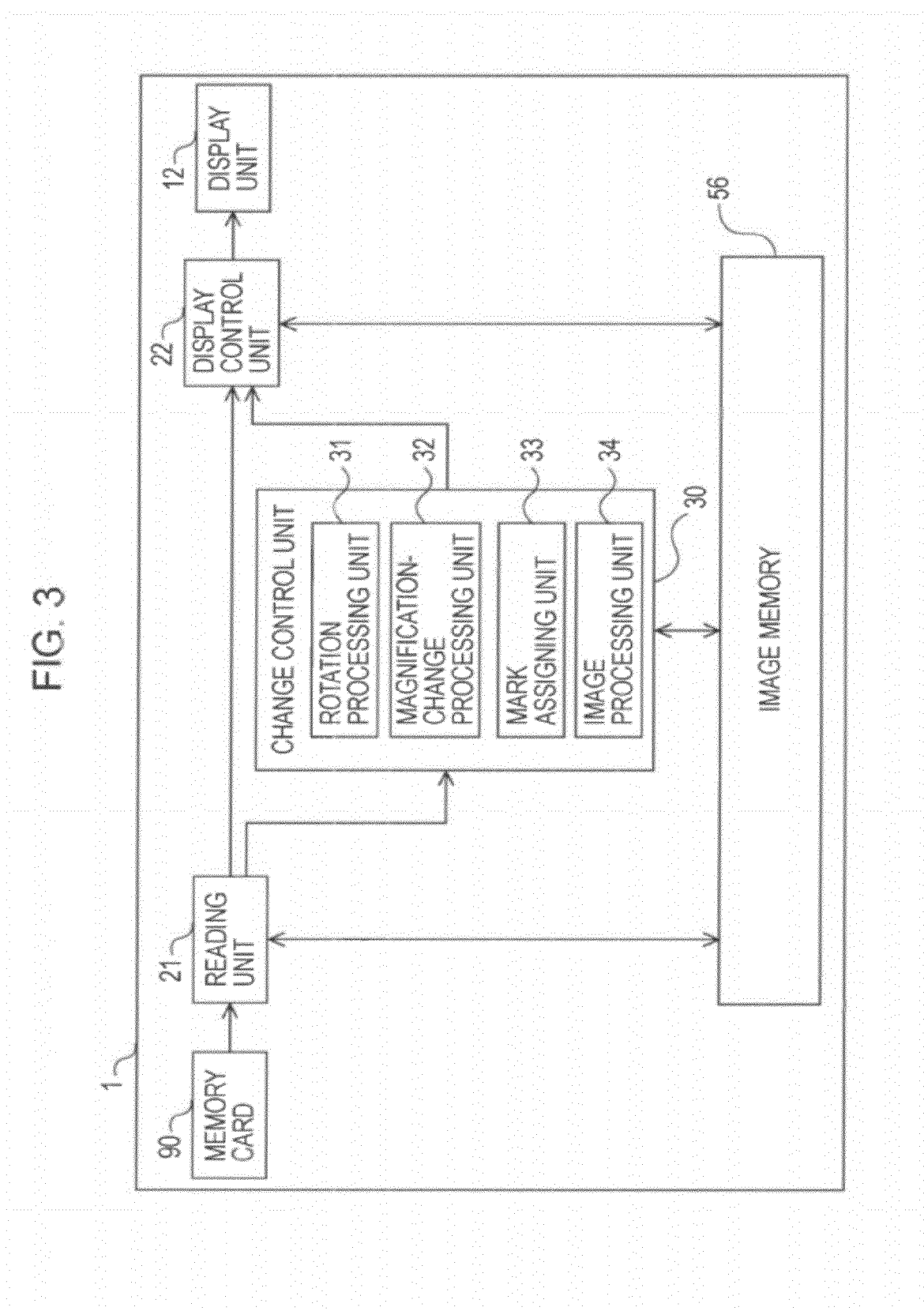
FIG. 3 is a block diagram showing a functional structure of the image-capturing device.

As shown in a functional block diagram of FIG. 3, the image-capturing device 1 includes a reading unit 21, a display control unit 22, the rear monitor 12 (display unit), a change control unit 30, an image memory 56, etc.

The reading unit 21 controls a process of reading image data in the memory card 90 onto the image memory 56 of the image-capturing device 1.

The display control unit 22 controls a display action of displaying an image based on the image data saved in the image memory 56 on the rear monitor 12. The display control unit 22 controls the contents of the display on the rear monitor 12 so that a plurality of images different from one another are displayed in a plurality of secondary display regions SR (SR1 to SR3) (see FIG. 5) and so that an image P2 displayed in the secondary display region SR2, which is one of the plurality of secondary display regions SR1 to SR3, is also displayed in a primary display region MR. The display control unit 22 further controls the contents of the display in the rear monitor 12 so that the image P2 in a state of being subjected to a predetermined change is displayed in both the one secondary display region SR2 and the primary display region MR. Furthermore, the display control unit 22 also controls a resizing action, etc., regarding both an image to be displayed in the primary display region MR and a plurality of images to be displayed in the secondary display regions SR.

The change control unit 30 is a processing unit that carries out various changing processes regarding each image. The change control unit 30 has a rotation processing unit 31, a magnification-change processing unit 32, a mark assigning unit 33, and an image processing unit 34. The rotation processing unit 31 is a processing unit that executes a process of rotating an image, and the magnification-change processing unit 32 is a processing unit that executes a process of changing the magnification of an image (an enlargement process and a reduction process). Further, the mark assigning unit 33 is a processing unit that assigns a predetermined mark (for example, a deletion mark indicating an image to be deleted, etc.) to an image, and the image processing unit (image quality adjustment processing unit) 34 is a processing unit that carries out a changing process regarding color, contrast, brightness, etc. (an image quality adjustment process) on an image.

The image memory 56 is a high-speed accessible image memory for temporarily storing image data, and has a capacity capable of storing image data for a plurality of frames.

<3. Playback Action>

<3-1. Overview and Rotation Process>

Figure 5:
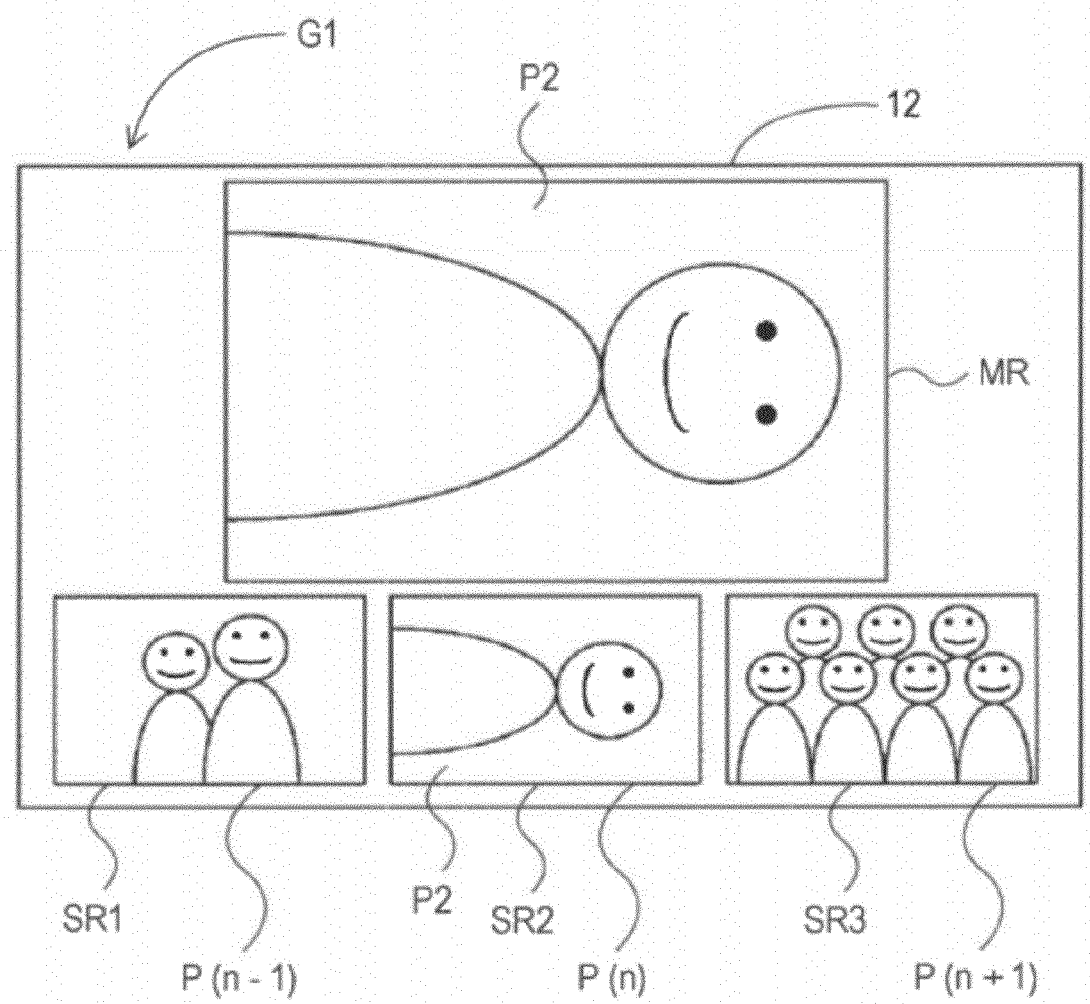
FIG. 5 is a diagram showing an image playback screen on a rear monitor.

Next, a playback action in the image-capturing device 1 will be explained with reference to FIG. 5. FIG. 5 is a diagram showing an example of a playback screen (image playback screen) G1 on the rear monitor 12. The playback screen G1 is displayed on the rear monitor 12 in accordance with the switching of the mode of the image-capturing device 1 to the "playback mode" by the operation of the mode setting dial 82, etc.

As shown in FIG. 5, the playback screen G1 of the rear monitor 12 is provided with a single relatively large primary display region MR and a plurality of (herein, three) relatively small secondary display regions SR (SR1 to SR3). The main display region MR is arranged on the upper side in the rear monitor 12, and the secondary display regions SR (SR1 to SR3) are horizontally arranged side-by-side on the lower side in the rear monitor 12. Further, each of the secondary display regions SR1 to SR3 is a region smaller than the primary display region MR, and has a size (area) which is, for example, a fraction in which the denominator has a value from about a few to about a dozen (for example, about ¼) of that of the primary display region MR.

A plurality of images read from the memory card 90 are displayed on the respective display regions MR and SR. Specifically, three consecutive images among a plurality of images arranged in order based on a predetermined standard (for example, in shooting number order) are displayed on the three secondary display regions SR1 to SR3. Further, the image P2 displayed in one secondary display region (more specifically, the center secondary display region SR2) among the three secondary display regions SR1 to SR3 is also displayed in the primary display region MR.

More specifically, first, the reading unit 21 (FIG. 3) reads the n-th image P(n) from the memory card 90 onto the image memory 56. Thereafter, the display control unit 22 carries out a resizing process regarding the n-th image P(n) to generate image data PM having a number of pixels corresponding to the size of the primary display region MR and image data PS (PS2) having a number of pixels corresponding to the size of the secondary display region SR (SR2).

The reading unit 21 further reads the (n−1)-th image P(n−1) from the memory card 90 onto the image memory 56. Then, the display control unit 22 carries out a resizing process regarding the (n−1)-th image P(n−1) to generate image data PS (PS1) having a number of pixels corresponding to the size of the secondary display region SR (SR1).

The reading unit 21 further reads the (n+1)-th image P(n+1) from the memory card 90 onto the image memory 56. Then, the display control unit 22 carries out a resizing process regarding the (n+1)-th image P(n+1) to generate image data PS (PS3) having a number of pixels corresponding to the size of the secondary display region SR (SR3).

Then, the display control unit 22 executes a display action on the rear monitor 12 using the image data PM and PS1 to PS3. Specifically, relatively small images (also referred to as sub-images (secondary images)) are displayed in the secondary display regions SR1 to SR3 of the rear monitor 12 using the image data PS1 to PS3, and a relatively large image (also referred to as a main image (primary image)) is displayed in the primary display region MR of the rear monitor 12 using the image data PM.

Figure 6:
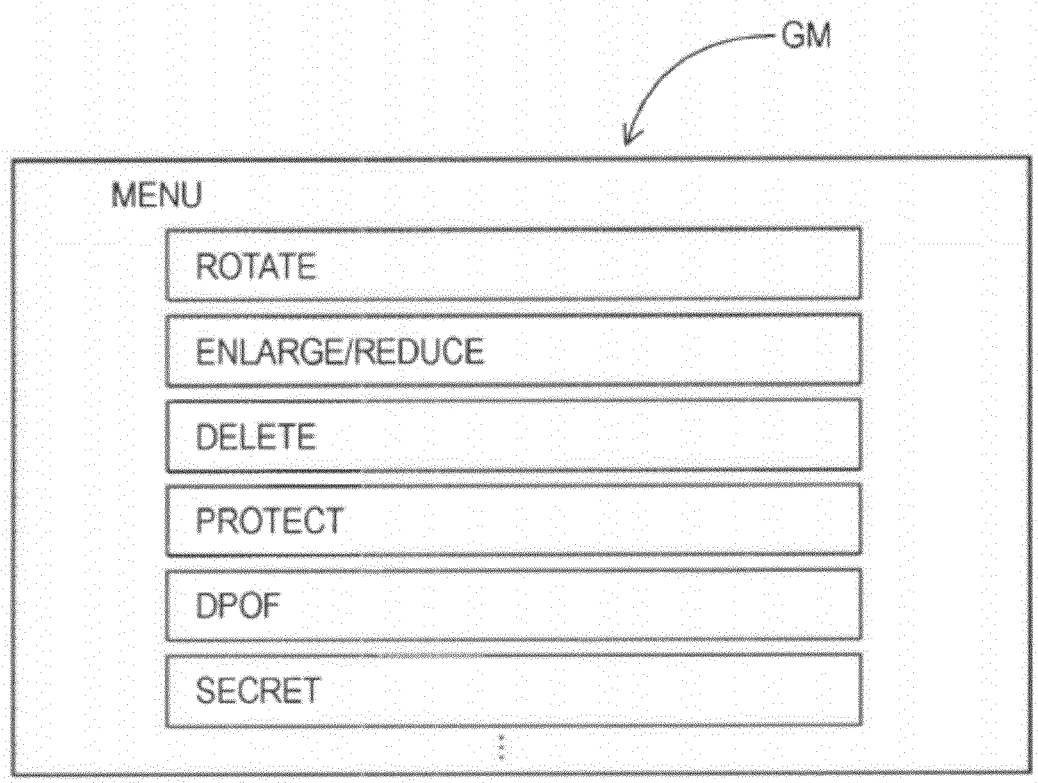
FIG. 6 is a diagram showing a menu screen.

Thereafter, in this state, when the menu button 83A is pressed, a menu screen GM as in FIG. 6 is displayed on the rear monitor 12 in place of the screen G1 (FIG. 5) by the display control unit 22. The menu screen GM has a plurality of menu items enumerated, including "rotate", "enlarge/reduce" (magnification change), "delete", "protect", "DPOF", "secret", "change the brightness", etc. When a desired menu item is selected from among the plurality of menu items by the operator of the image-capturing device 1, a desired changing action associated with the selected item is executed.

First, a case where the menu item "rotate" is selected will be exemplified hereinafter.

When the menu item "rotate" is selected, the screen G1 of FIG. 5 appears again. In this regard, the image rotating process is enabled on the returned screen G1.

Specifically, first, the scrolling action regarding the plurality of secondary display regions SR1 to SR3, etc., is executed using the left button 84L and right button 84R of the direction selection key 84, and an image targeted for the "rotate" process is selected.

For example, when the left button 84L is pressed, the image P(n−1) that has been displayed in the leftmost-side secondary display region SR1 is displayed in the center secondary display region SR2 and is also displayed in the primary display region MR. Further, the image P(n) that has been displayed in the center secondary display region SR2 is displayed in the rightmost-side secondary display region SR3. Further, another image P(n−2) that virtually exists on the left side with respect to the image P(n−1) is displayed in the leftmost-side secondary display region SR1. Note that, thereafter, when the left button 84L is further pressed, a similar action is executed and the scrolling action of moving a left-side image to the center is further realized.

Alternatively, conversely, when the right button 84R is pressed, the image P(n+1) that has been displayed in the rightmost-side secondary display region SR3 is displayed in the center secondary display region SR2 and is also displayed in the primary display region MR. Further, the image P(n) that has been displayed in the center secondary display region SR2 is displayed in the leftmost-side secondary display region SR1. Further, another image P(n+2) that virtually exists on the right side with respect to the image P(n+1) is displayed in the rightmost-side secondary display region SR3.

With such a scrolling operation, three images among the plurality of images in the memory card 90 are displayed in the three secondary display regions SR1 to SR3. Further, as described above, an image displayed in the center secondary display region SR2 at each time point is also displayed in the upper primary display region MR. Therefore, an image targeted for processing can be confirmed using a relatively large main image displayed in the primary display region MR.

And in a state where an image targeted for the rotation process is being displayed in both the secondary display region SR2 and the primary display region MR, each time the operator presses the center button 84C once, the targeted image is rotated in steps of 90 degrees counterclockwise. For example, when the center button 84C is pressed once, the targeted image is rotated 90 degrees. In accordance with this, the vertical-oriented image which is displayed laterally in FIG. 5 is displayed in a portrait orientation (correct orientation) in the manner shown in FIG. 7. Note that when the center button 84C is pressed twice, the targeted image is rotated 180 degrees and when the center button 84C is pressed three times, the targeted image is rotated 270 degrees.

More specifically, when the center button 84C is pressed once, a 90-degree rotation process (also represented as an "orientation" changing process) is carried out on the image data PM for displaying the targeted image in the primary display region MR. Further, a same-rotation-angle (90-degree) rotation process is also carried out on the image data PS2 for display in the secondary display region SR2 regarding the same targeted image. And the targeted image is displayed in the primary display region MR using the image data PM obtained after the rotation process. In addition, the targeted image is displayed in the secondary display region SR2 using the image data PS2 obtained after the rotation process. Further, the fact that the 90-degree rotation process regarding the targeted image has been carried out is also stored in a storage unit (for example, the image memory 56, etc.) of the image-capturing device 1.

Note that a case is exemplified herein in which a predetermined changing process is individually carried out on two pieces of image data of the targeted image (that is, the image data PM for display in the primary display region MR and the image data PS2 for display in the secondary display region SR2). However, this is not restrictive. For example, a predetermined changing process may be carried out on one image data PM of the targeted image to generate new image data PM, and a resizing process may be carried out on the new image data PM to generate new image data PS2 for display in the secondary display region SR2. Alternatively, after a predetermined changing process is carried out on original image data of the targeted image, different resizing processes may be carried out on the image data obtained after the changing process to generate two types of new image data PM and PS2. Further, a case has been exemplified herein in which the contents of the change (a rotation angle, etc.) regarding the image are stored in the storage unit of the image-capturing device 1. However, this is not restrictive. For example, in the image data stored in the memory card 90, the contents of the change may be stored as additional information for the image data. Furthermore, a case has been exemplified herein in which while the image data stored in the memory card 90 is maintained as it is, a change is added to image data read into the image-capturing device 1 from the memory card 90. However, this is not restrictive. For example, a variety of changes (rotation, etc.) may be added to the image data itself in the memory card 90.

Figure 7:
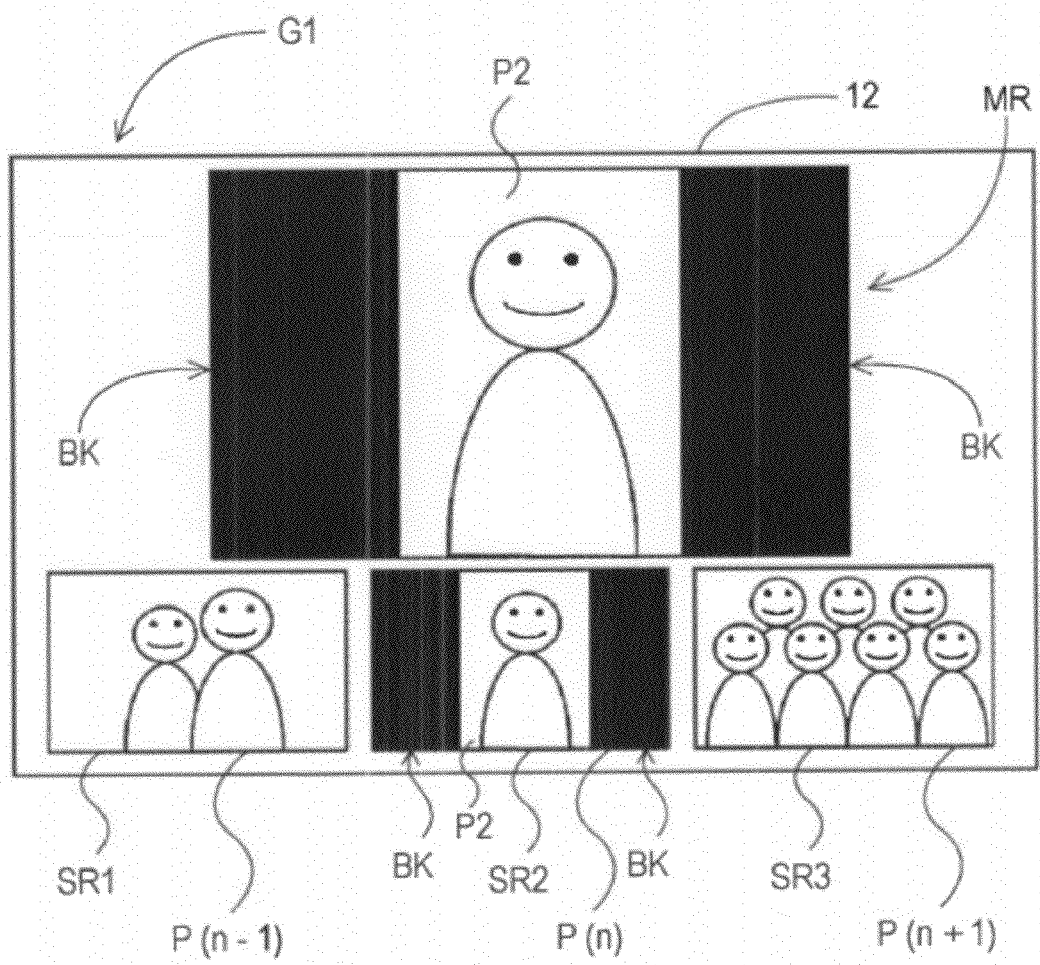
FIG. 7 is a diagram showing a playback screen obtained after a rotation process.

Thereafter, the playback screen G1 is updated using the image data obtained after the change. Specifically, as shown in FIG. 7, the image P2 in a state of being subjected to a change regarding rotation (rotation process) (that is, the image P2 obtained after rotation) is displayed in both the primary display region MR and the center secondary display region SR2. Note that blank portions caused by mismatch on the aspect ratio after the rotation of the image P2 in the respective regions MR and SR2 are displayed as black regions BK.

In the foregoing display action, a plurality of images are displayed in the plurality of secondary display regions SR (SR1 to SR3), and the image P2 displayed in the center secondary display region SR2 among the plurality of secondary display regions SR1 to SR3 is also displayed in the primary display region MR. Therefore, the plurality of secondary display regions SR1 to SR3 can be used to provide visual confirmation of the given image P2 while performing comparison with remaining images, and the relatively large primary display region MR can be used to secure visual confirmation of the given image P2.

In particular, the image P2 in a state of being subjected to a predetermined change (herein, the rotation process) is displayed in a relatively large size in the primary display region MR. This facilitates confirmation of the contents of the change (in other words, confirmation of the rotated image). Further, the image P2 in a state of being subjected to the change is also displayed in the center secondary display region SR2 among the plurality of secondary display regions SR. This allows confirmation of the predetermined change of the image P2 while performing comparison with remaining images. More specifically, the fact that the predetermined change has been carried out on the image P2 among the plurality of images can be confirmed while performing comparison with remaining images.

Figure 8:
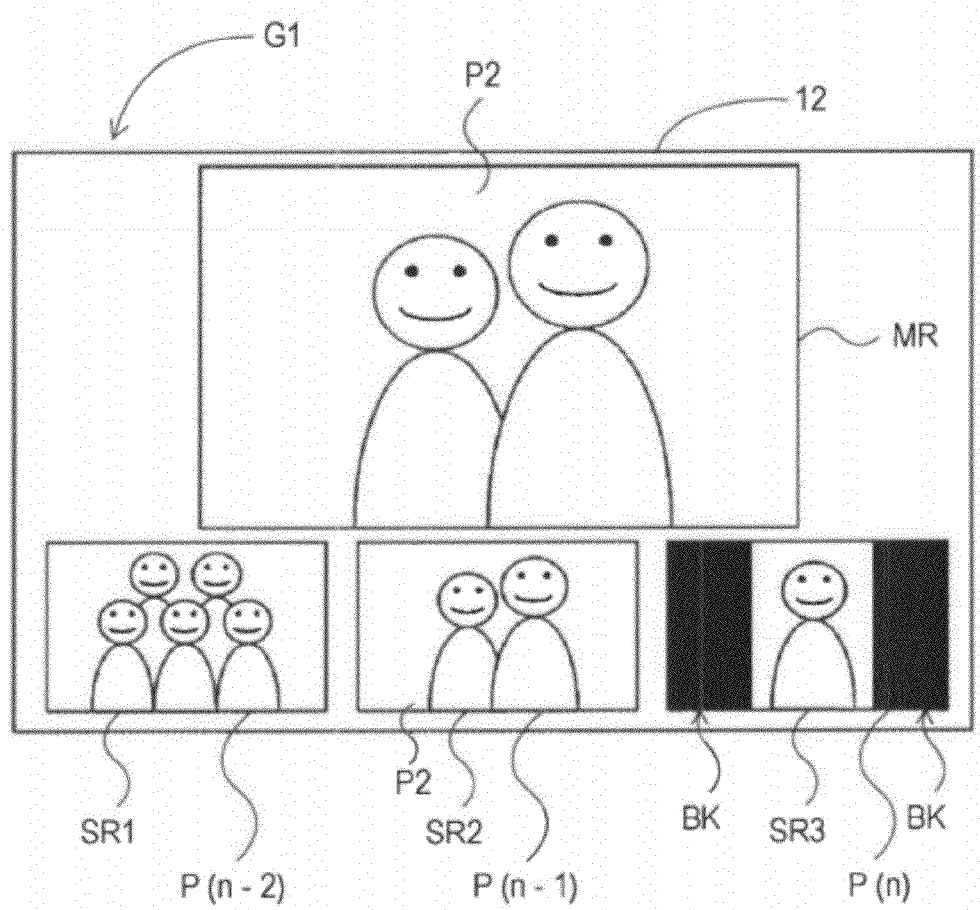
FIG. 8 is a diagram showing a playback screen obtained by performing scrolling after a rotation process.

Further, thereafter, a similar rotation operation, involving the scrolling operation regarding the plurality of secondary display regions SR, can also be executed on remaining images. Further, in connection to this, an image on which a rotation process has been carried out prior to a scrolling operation (for example, the image P2) is displayed in accordance with the scrolling operation in the remaining secondary display region SR1 (or SR3) different from the center secondary display region SR2 among the plurality of secondary display regions SR in the state obtained after the rotation process. For example, even when the image P(n) displayed in the center secondary display region SR2 in FIG. 7 is moved to the rightmost secondary display region SR3 by the scrolling operation and is displayed in the manner shown in FIG. 8, the image P(n) is displayed in the rightmost secondary display region SR3 in the state obtained after the rotation. In this manner, during the scrolling operation, an image can be confirmed in each of the plurality of secondary display regions SR in a state where a rotation result regarding the corresponding image is reflected.

Note that when the operation of instructing a rotation process is to be terminated, the menu button 83A may be pressed once again and a "normal display" item (not shown in the figure) in the menu screen may be selected. According to this operation, a state occurs again in which the execution of the operation of instructing a rotation process is not enabled, after which the playback screen G1 is displayed again on the rear monitor 12.

<3-2. Magnification-Changing Process>

Next, a case where the menu item "enlarge/reduce" is selected on the menu screen GM (FIG. 6) will be exemplified.

When the menu item "enlarge/reduce" is selected, the screen G1 (see FIG. 5) is displayed again on the rear monitor 12 in place of the menu screen GM. In this regard, the image magnification-changing process (enlargement/reduction process) is enabled on the screen G1 obtained after the redisplay.

Specifically, first, the scrolling action regarding the plurality of secondary display regions SR1 to SR3, etc., is executed using the left button 84L and right button 84R of the direction selection key 84, and an image targeted for the "magnification change" process is selected.

Figure 9:
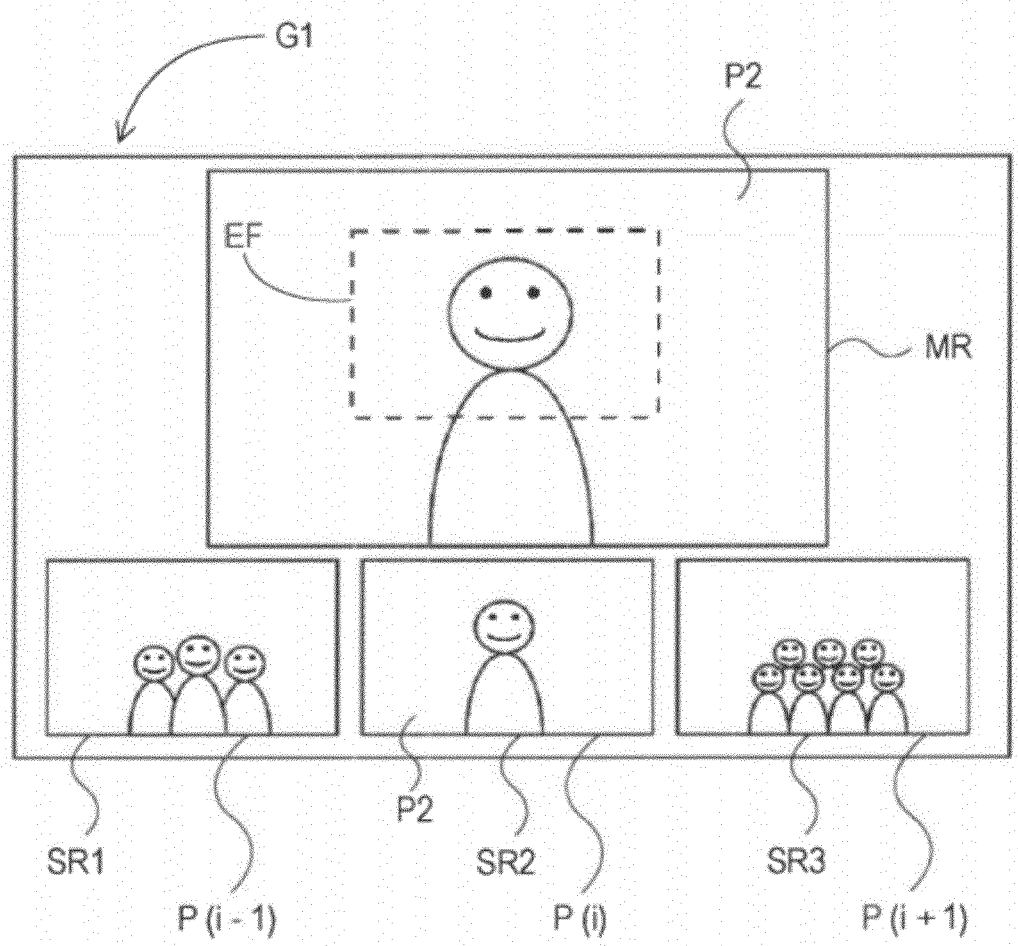
FIG. 9 is a diagram showing a playback screen obtained after a scrolling operation.

FIG. 9 is a diagram showing a playback screen G1 obtained after the scrolling action.

And in a state where an image P(i) targeted for the magnification-changing process is being displayed in both the primary display region MR and the secondary display region SR2, a magnification-changing instruction operation for the targeted image is accepted. Specifically, when the up button 84U is pressed, it is regarded that an enlargement instruction has been made. When the down button 84D is pressed, it is regarded that a reduction instruction has been made.

In this magnification-changing operation (particularly, the enlargement operation), further, the operation of setting an enlargement position is also accepted. Specifically, when the shift button 83D is pressed once, the changing of the setting of the enlargement position is enabled. And an enlargement frame EF is moved within the primary display region MR using the up button 84U, the down button 84D, the left button 84L, and the right button 84R, and an enlargement position is set. As shown in FIG. 9, the enlargement frame EF indicates a display target region to be obtained after the enlargement. Further, when the shift button 83D is pressed again, the mode of setting an enlargement position is terminated, and an enlargement instruction using the up button 84U, a reduction instruction using the down button 84D, etc., are accepted again.

For example, when the up button 84U is pressed, the image is enlarged in accordance with a predetermined magnification factor (for example, 200%). It is assumed herein that the up button 84U has been pressed once and an instruction for enlarging the original image by a factor of two has been given.

If such an enlargement instruction is given, the image data of the targeted image P(i) is read again from the memory card 90, and a region within the enlargement frame EF of the targeted image P(i) is cut and is further resized by reducing the decimation degree in accordance with the predetermined magnification factor to generate new image data PM for enlarged display in the primary display region MR. Further, based on the new image data PM for enlarged display, new image data PS2 for enlarged display in the secondary display region SR2 regarding the targeted image is also generated. Further, the fact that an enlargement process by a factor of two has been carried out regarding the targeted image and the enlargement center position are also stored in the storage unit (a memory, etc.) of the image-capturing device 1.

Figure 10:
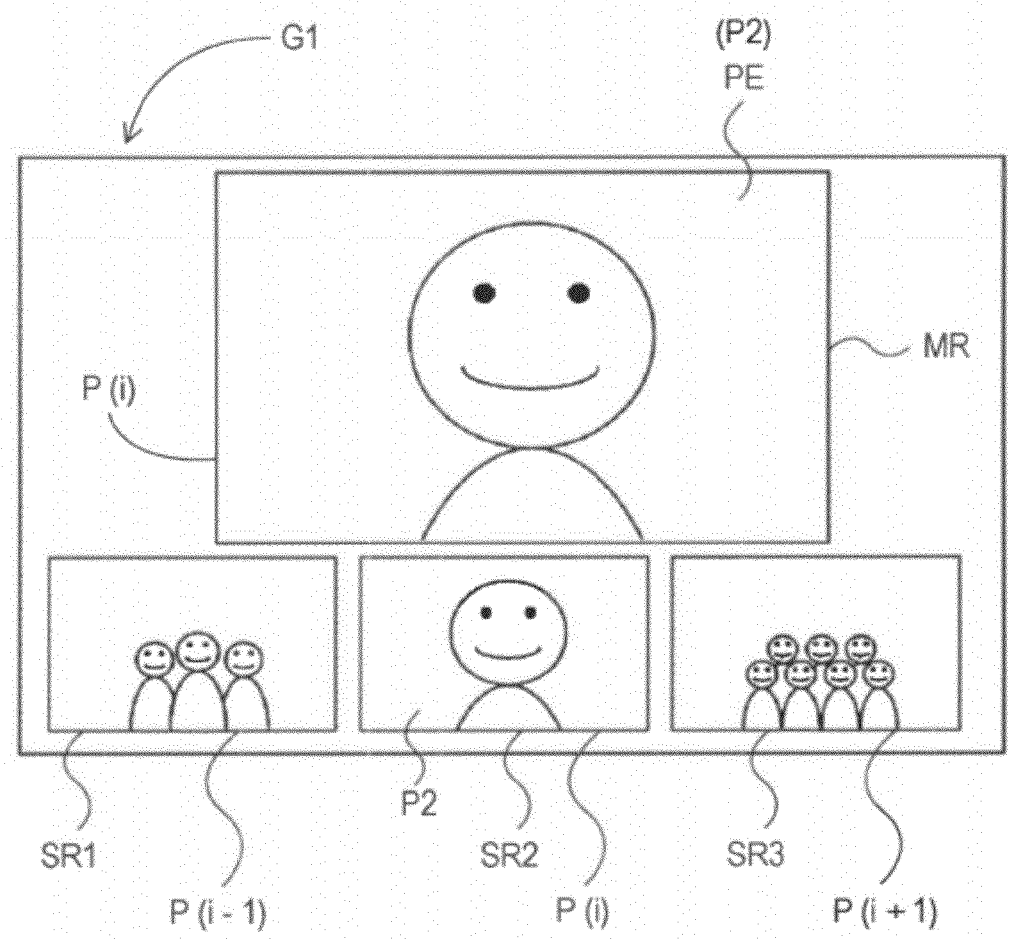
FIG. 10 is a diagram showing a playback screen obtained after an enlargement process.

And the playback screen G1 is updated using the image data PM, PS2, etc., obtained after the change. Specifically, as shown in FIG. 10, the targeted image P(i) is displayed in the primary display region MR using the new image data PM obtained after the enlargement process, and the targeted image P(i) is displayed in the secondary display region SR2 using the new image data PS2. In other words, the image P2 in a state of being subjected to the change regarding magnification changing (herein, the enlargement process) (that is, an image PE obtained after the enlargement) is displayed in both the primary display region MR and the center secondary display region SR2.

In the foregoing display action, a plurality of images are displayed in the plurality of secondary display regions SR (SR1 to SR3), and the image P2 displayed in the center secondary display region SR2 among the plurality of secondary display regions SR1 to SR3 is also displayed in the primary display region MR. Therefore, the plurality of secondary display regions SR1 to SR3 can be used to provide visual confirmation of the given image P2 while performing comparison with remaining images, and the primary display region MR which is relatively large can be used to secure visual confirmation of the given image P2.

In particular, the image P2 in a state of being subjected to a predetermined change (herein, the magnification-changing process) is displayed in a relatively large size in the primary display region MR. This facilities confirmation of the contents of the change (in other words, confirmation of the image whose magnification has been changed). Further, the image P2 obtained after the change is also displayed in the center secondary display region SR2 among the plurality of secondary display regions SR. This allows confirmation of the predetermined change carried out on the image P2 among the plurality of images while performing comparison with remaining images. Furthermore, the contents of the predetermined change of the image P2 can also be confirmed while performing comparison with remaining images.

Further, thereafter, a similar magnification-changing operation regarding a remaining image can also be executed involving the scrolling operation.

Figure 11:
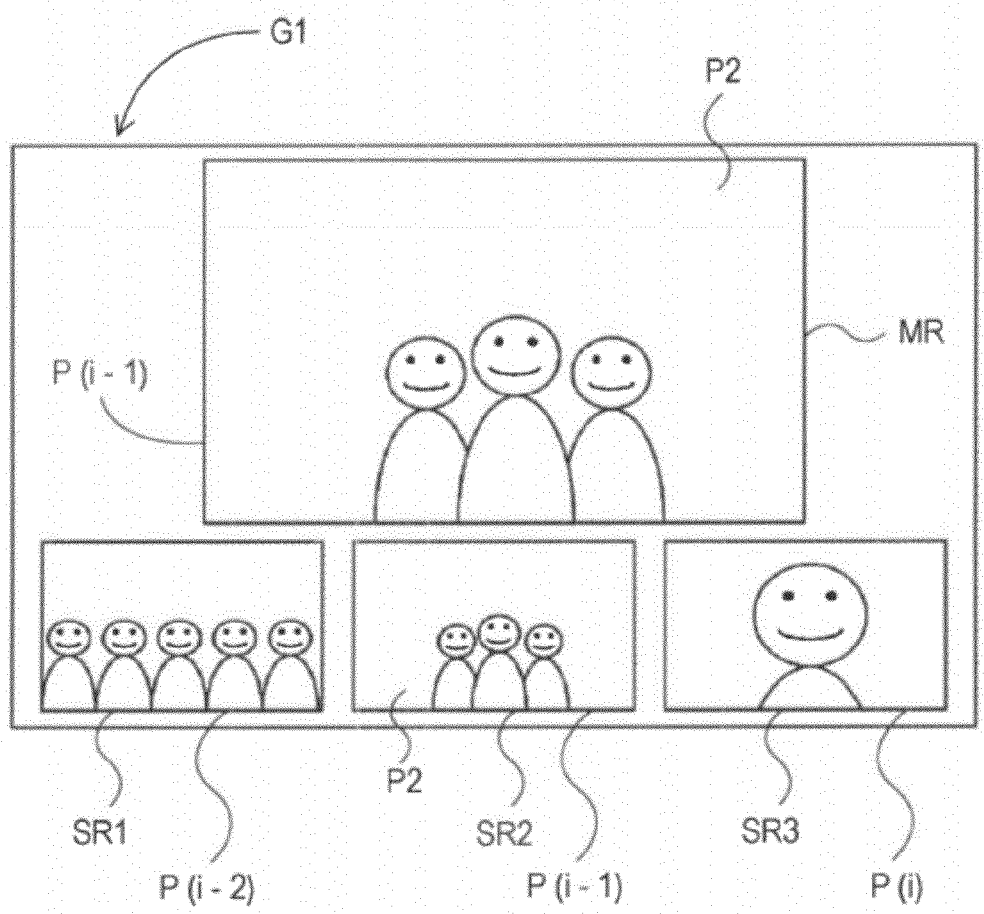
FIG. 11 is a diagram showing a playback screen obtained after a further scrolling operation.

For example, in the state where the screen G1 of FIG. 10 is being displayed on the rear monitor 12, when the left button 84L is pressed, the screen G1 is updated to a state of FIG. 11. Specifically, the image P(i−1) that has been displayed in the leftmost-side secondary display region SR1 is displayed in the center secondary display region SR2 and is also displayed in the primary display region MR. Further, the image P(i) that has been displayed in the center secondary display region SR2 is displayed in the rightmost-side secondary display region SR3. Further, another image P(i−2) that virtually exists on the left side with respect to the image P(i−1) is displayed in the leftmost-side secondary display region SR1.

In connection to this, the image in the secondary display region SR2 on which the magnification-changing process has been carried out by the previous operation is displayed in the state obtained after the magnification change even when the image has been moved to the remaining secondary display region SR1 or SR3. For example, in FIG. 10, a case is assumed in which the image P(i) that has been displayed in the center secondary display region SR2 is moved to the rightmost secondary display region SR3 by the scrolling operation and is displayed. In this case, as shown in FIG. 11, the image P(i) is displayed in the rightmost secondary display region SR3 in the state obtained after the magnification change (more specifically, in the state where the image P(i) is still enlarged by a factor of two).

In this manner, during the scrolling operation, an image can be confirmed in each of the plurality of secondary display regions SR in a state where a magnification changing result regarding the corresponding image is reflected.

Figure 12:
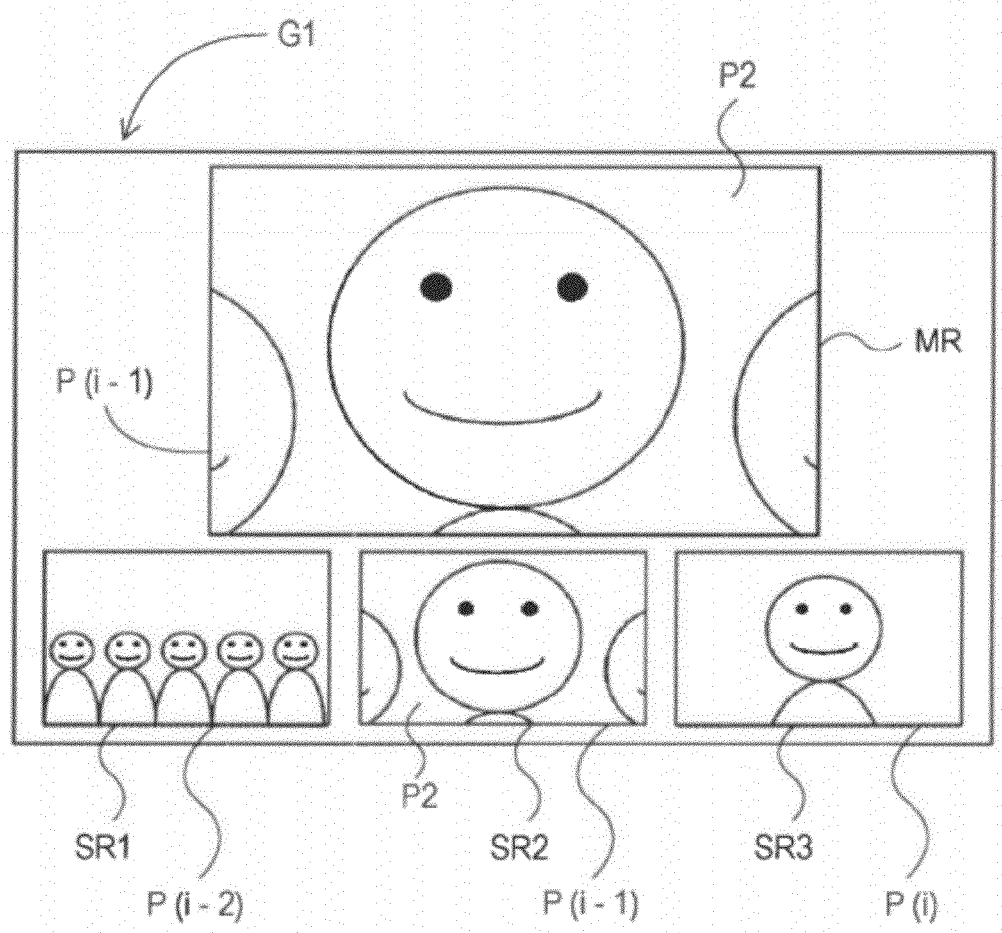
FIG. 12 is a diagram showing a playback screen obtained after an enlargement process regarding a remaining image.

Furthermore, thereafter, a desired image being displayed in the primary display region MR and the center secondary display region SR2 during the scrolling operation, for example, the image P(i−1), can be targeted to execute a magnification-changing process. Note that, in connection to this, a magnification-changing process by a unique magnification factor (for example, a magnification factor different from the magnification factor for the image P(i)) (for example, an enlargement process by a factor of four) can be carried out on the image P(i−1). In FIG. 12, a state is shown in which the image P(i−1) on which an enlargement process by a factor of four has been carried out is displayed in both the primary display region MR and the center secondary display region SR2. Meanwhile, the image P(i) is displayed in the secondary display region SR3 in the state where the image P(i) is still enlarged by a factor of two.

As in the foregoing, an image in a state of being subjected to a change process (herein, a magnification-changing process) is displayed in each of the secondary display regions SR1 to SR3. This facilitates comparison with remaining images. Particularly in the secondary display regions SR1 to SR3, images enlarged by individually set magnification factors are respectively displayed. This allows each of the images to be visually confirmed in a desired state in the corresponding secondary display region.

Note that while an enlargement process has been mainly explained, a similar argument applies to a reduction process.

Figure 13:
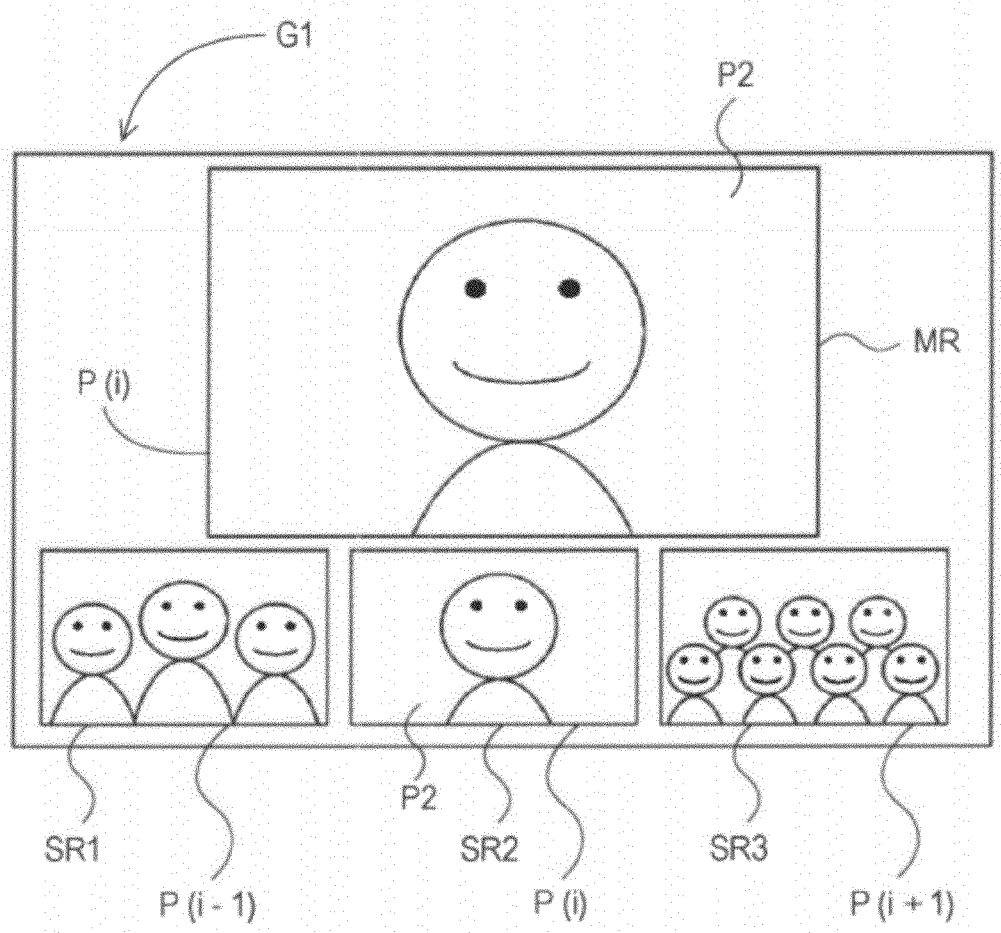
FIG. 13 is a diagram showing a playback screen obtained after an enlargement process according to an exemplary modification.

In this embodiment, further, a case has been exemplified in which images are displayed in the respective secondary display regions SR (SR1 to SR3) in the state of changed magnifications set individually for the images (see FIG. 10). However, this is not restrictive. For example, in accordance with a magnification-changing operation in the primary display region MR (more specifically, the operation of pressing the up button 84U), as shown in FIG. 13, magnification-changed images that employ the same magnification changing state as that in the primary display region MR may be displayed in all the secondary display regions SR (SR1 to SR3). A screen G1 of FIG. 13 is common to the screen G1 of FIG. 10 in that an image obtained by enlarging the image P(i) by a factor of two is displayed in the secondary display region SR2. On the other hand, the difference from FIG. 10 is that images enlarged by the same magnification factor (that is, a factor of two) are also displayed in the remaining secondary display regions SR1 and SR3. Specifically, the difference from FIG. 10 is that a factor-of-two enlarged image regarding the image P(i−1) is displayed in the secondary display region SR1 and that a factor-of-two enlarged image regarding the image P(i+1) is displayed in the secondary display region SR3.

<3-3. Deletion Process>

Next, a case where the menu item "delete" is selected on the menu screen GM (FIG. 6) will be exemplified.

When the menu item "delete" is selected, the screen G1 (see FIG. 5) is displayed again on the rear monitor 12 in place of the menu screen GM. In this regard, the image deletion process, more specifically, the "selective deletion process" of deleting only an image selected (specified) by the operator, is enabled on the screen G1 obtained after the redisplay.

Specifically, first, the scrolling action regarding the plurality of secondary display regions SR1 to SR3, etc., is executed using the left button 84L and right button 84R of the direction selection key 84, and an image targeted for the "delete" process is selected.

Figure 14:
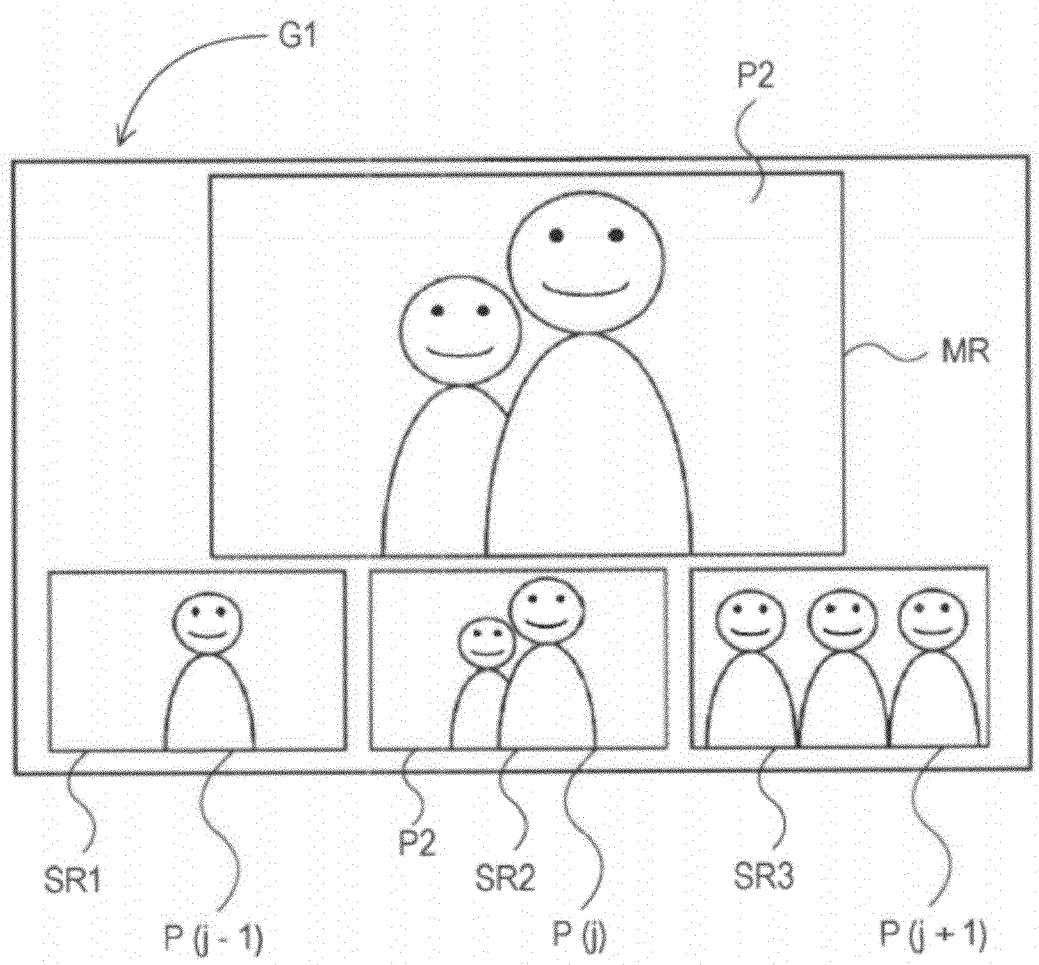
FIG. 14 is a diagram showing a playback screen G1 obtained after a scrolling operation.

FIG. 14 is a diagram showing a playback screen G1 obtained after the scrolling action.

And in the state where an image P(j) targeted for the deletion process is being displayed in both the primary display region MR and the secondary display region SR2, when the center button 84C is pressed, a provisional deletion instruction for the targeted image P(j) is accepted. Note that when the center button 84C is pressed again, the provisional deletion instruction for the targeted image P(j) is canceled.

Figure 15:
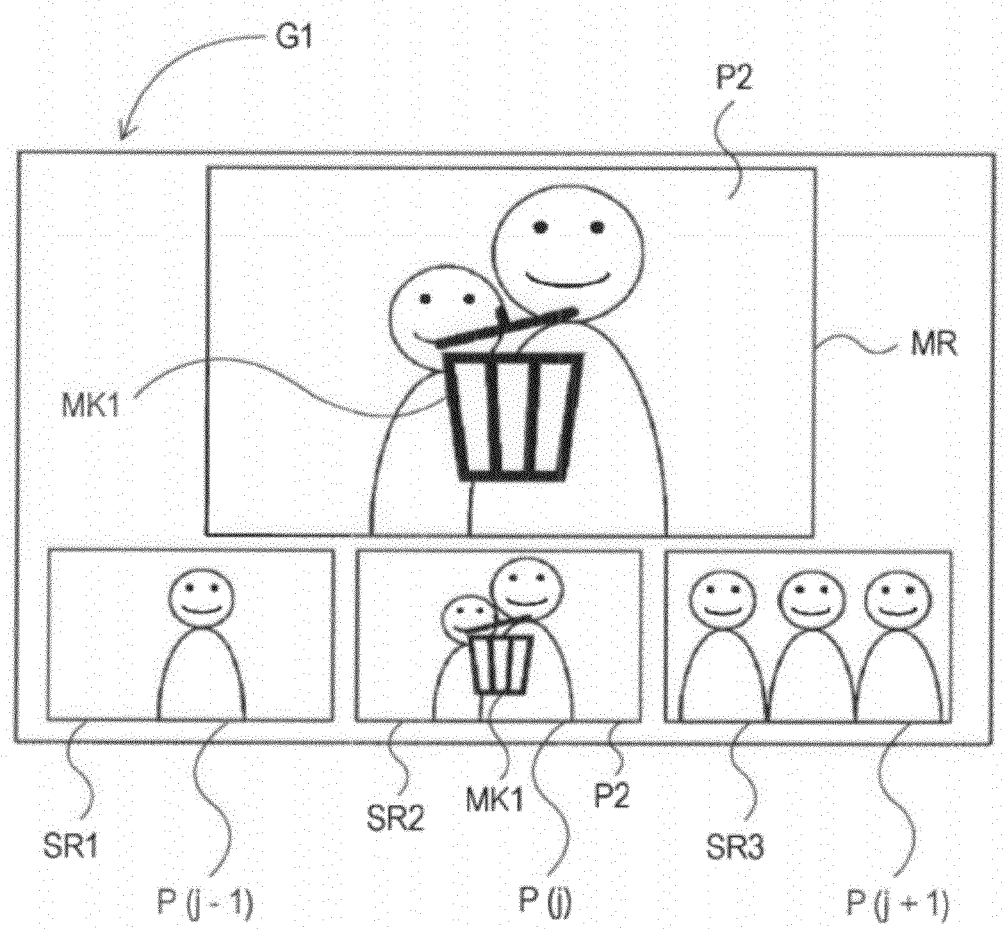
FIG. 15 is a diagram showing a playback screen obtained after the assignment of a deletion mark.

If a deletion instruction is given by pressing the center button 84C, as shown in FIG. 15, an image process (a deletion mark assignment process) is carried out on image data PM of the targeted image P(j) for display in the primary display region MR. This deletion mark assignment process is an image process of drawing a mark indicating that the image is to be deleted (also referred to as a deletion mark) MK1 on the targeted image P(j) so as to be superimposed thereon. Further, a similar process of assigning the deletion mark MK1 is also carried out on image data PS2 for display in the secondary display region SR2 regarding the same targeted image P(j). And the targeted image P(j) assigned the deletion mark MK1 is displayed in the primary display region MR using new image data PM, and the targeted image P(j) assigned the deletion mark MK1 is displayed in the secondary display region SR2 using new image data PS2. Further, the fact that an instruction for deletion (a deletion instruction) has been given regarding the targeted image P(j) is stored in the storage unit (a memory, etc.) of the image-capturing device 1.

In the foregoing display action, a plurality of images are displayed in the plurality of secondary display regions SR (SR1 to SR3), and the image P2 (image P(j)) displayed in the center secondary display region SR2 among the plurality of secondary display regions SR1 to SR3 is also displayed in the primary display region MR. Therefore, the plurality of secondary display regions SR1 to SR3 can be used to provide visual confirmation of the given image P2 while performing comparison with remaining images, and the primary display region MR which is relatively large can be used to secure visual confirmation of the given image P2.

In particular, the image P2 (image P(j)) in a state of being subjected to a predetermined change (herein, the process of assigning the deletion mark MK1) is displayed in a relatively large size in the primary display region MR. This facilitates confirmation of the contents of the change (in other words, confirmation of the presence of the deletion mark MK1). Further, the image P2 (image P(j)) obtained after the change is also displayed in the center secondary display region SR2 among the plurality of secondary display regions SR1 to SR3. This allows confirmation of the predetermined change of the image P2 while performing comparison with remaining images. More specifically, the fact that a deletion instruction has been given for the given image P2 among the plurality of images can be recognized while performing comparison (contrast) with the remaining images displayed in the respective secondary display regions SR1 to SR3.

Further, thereafter, a similar deletion-instruction-giving operation regarding a remaining image can also be executed involving the scrolling operation.

Figure 16:
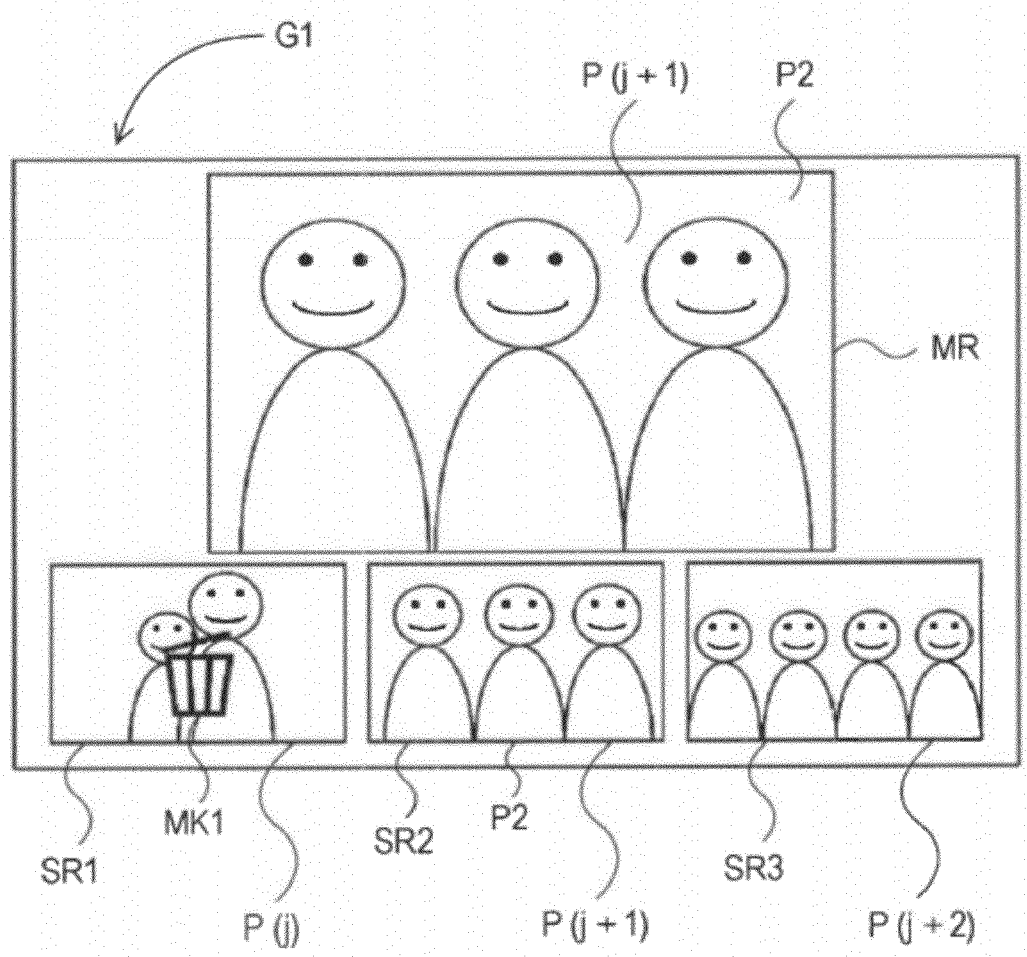
FIG. 16 is a diagram showing a playback screen obtained after a further scrolling operation.

For example, in the state where the screen G1 of FIG. 15 is being displayed on the rear monitor 12, when the right button 84R is pressed, the screen G1 is updated to a state of FIG. 16. Specifically, the image P(j+1) that has been displayed in the rightmost-side secondary display region SR3 is displayed in the center secondary display region SR2 and is also displayed in the primary display region MR. Further, the image P(j) that has been displayed in the center secondary display region SR2 is displayed in the leftmost-side secondary display region SR1. Further, another image P(j+2) that virtually exists on the right side with respect to the image P(j+1) is displayed in the rightmost-side secondary display region SR3.

In connection to this, the image P(j) assigned the deletion mark MK1 by the previous operation is displayed in the state where the deletion mark MK1 has been assigned even when the image P(j) has been moved from the secondary display region SR2 to the remaining secondary display region SR1 or SR3. For example, in FIG. 15, a case is assumed in which the image P(j) that has been displayed in the center secondary display region SR2 is moved to the leftmost secondary display region SR1 by the scrolling operation and is displayed. In this case, as shown in FIG. 16, the image P(j) is displayed in the leftmost secondary display region SR1 in the state where the deletion mark MK1 has been assigned.

In this manner, an image that has been displayed in the state where the deletion mark MK1 has been assigned in the center secondary display region SR2 prior to a scrolling operation (for example, the image P2) is displayed in accordance with the scrolling operation in the secondary display region SR1 (or SR3) among the plurality of secondary display regions SR, which is different from the center secondary display region SR2, in the state where the deletion mark MK1 is still assigned. In accordance with this, during the scrolling operation, the operator can confirm an image in each of the plurality of secondary display regions SR in a state where the presence or absence of a deletion instruction (a deletion mark assignment result) regarding to the corresponding image is reflected. Thus, comparison (contrast) with remaining images is feasible.

Further, thereafter, a deletion mark assignment process can be executed on a desired image being displayed in the primary display region MR and the center secondary display region SR2 during the scrolling operation, for example, the image P(j+1). Specifically, in the state where the screen G1 of FIG.

Figure 17:
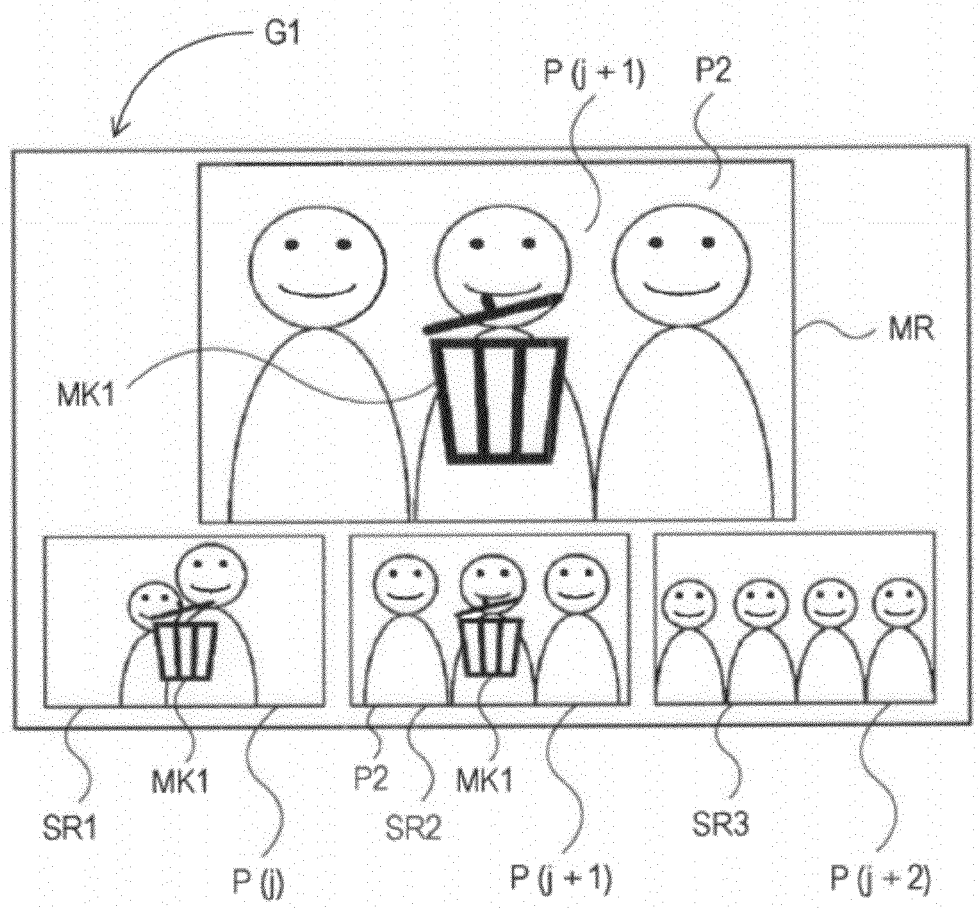
FIG. 17 is a diagram showing a playback screen obtained after the assignment of a deletion mark regarding a remaining image.

16 is being displayed on the rear monitor 12, when the center button 84C is pressed, the screen G1 is updated to a state shown in FIG. 17.

In FIG. 17, a state is shown in which the image P(j+1) on which a deletion mark assignment process has been carried out is displayed in both the primary display region MR and the center secondary display region SR2. Further, as described above, the image P(j) is displayed in the secondary display region SR1 in the state where the deletion mark MK1 is still assigned.

Further, by repeating a similar action, a deletion instruction for a larger number of images can be given.

And when all deletion-instruction-giving processes for images to be deleted have been terminated, the operator presses the menu button 83A once again. In response to this pressing operation, the image-capturing device 1 now displays a confirmation screen GC (see FIG. 18) on the rear monitor 12. And when a "YES" button on the screen GC is pressed, the contents of the current deletion instruction are set, and a deletion action is actually executed. Specifically, one or a plurality of the targeted images assigned the deletion mark (selected as deletion targets) are deleted from the memory card 90.

<3-4. Protection Process>

Next, a case where the menu item "protect" is selected on the menu screen GM (FIG. 6) will be exemplified.

When the menu item "protect" is selected, the screen G1 (see FIG. 5) is displayed again on the rear monitor 12 in place of the menu screen GM. In this regard, the image protection process, more specifically, the "selective protection process" of protecting (protection) an image selected (specified) by the operator, is enabled on the screen G1 obtained after the redisplay.

Figure 18:
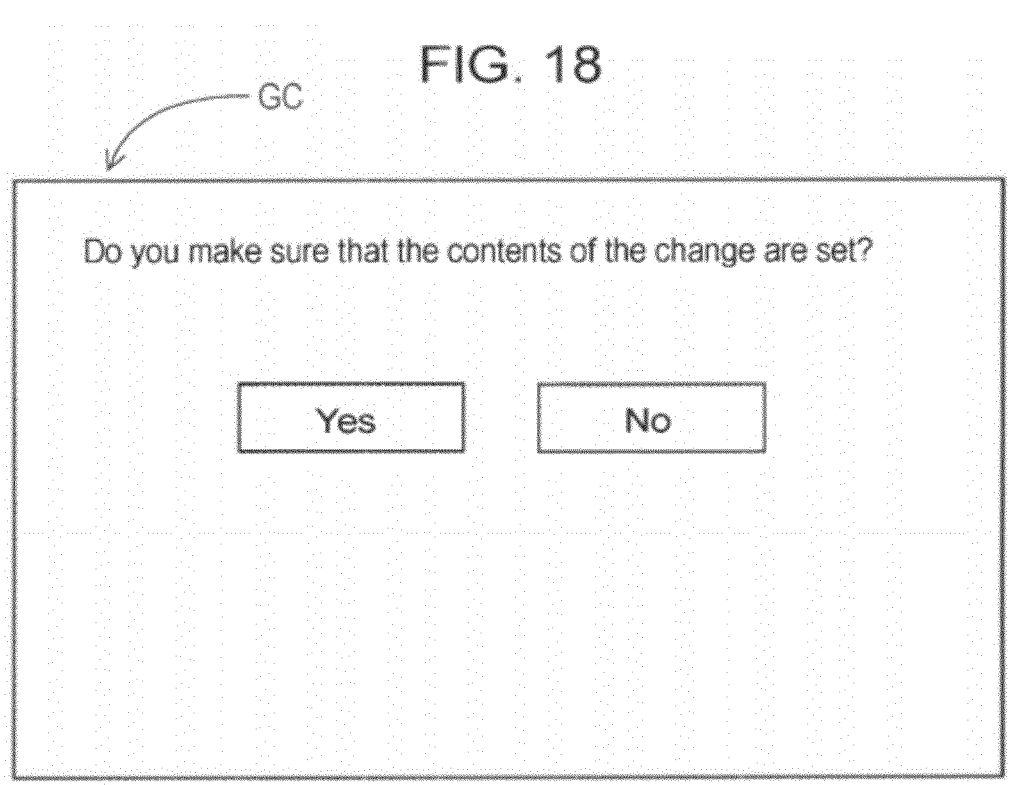
FIG. 18 is a diagram showing a confirmation screen.

An action of selecting a targeted image, an action of accepting an instruction for protecting the targeted image, etc., are executed in a manner similar to that of the "selective deletion process" described above. For example, in accordance with the pressing of the center button 84C, a protection instruction for the targeted image is given. Further, an operation of selecting a targeted image is executed involving the scrolling operation regarding the secondary display regions SR. Furthermore, when the menu button 83A is pressed after a protection instruction for one or a plurality of images has been given, a confirmation screen GC similar to that of FIG. 18 is displayed on the rear monitor 12. And in accordance with a setting instruction using the confirmation screen GC, a protection process for an image that is selected (a selected image) (specifically, a process of changing a file of the selected image to have a write-prohibition attribute in the memory card 90) is executed. This results in limited deletion, and correction, etc., of an unselected image.

Figure 19:
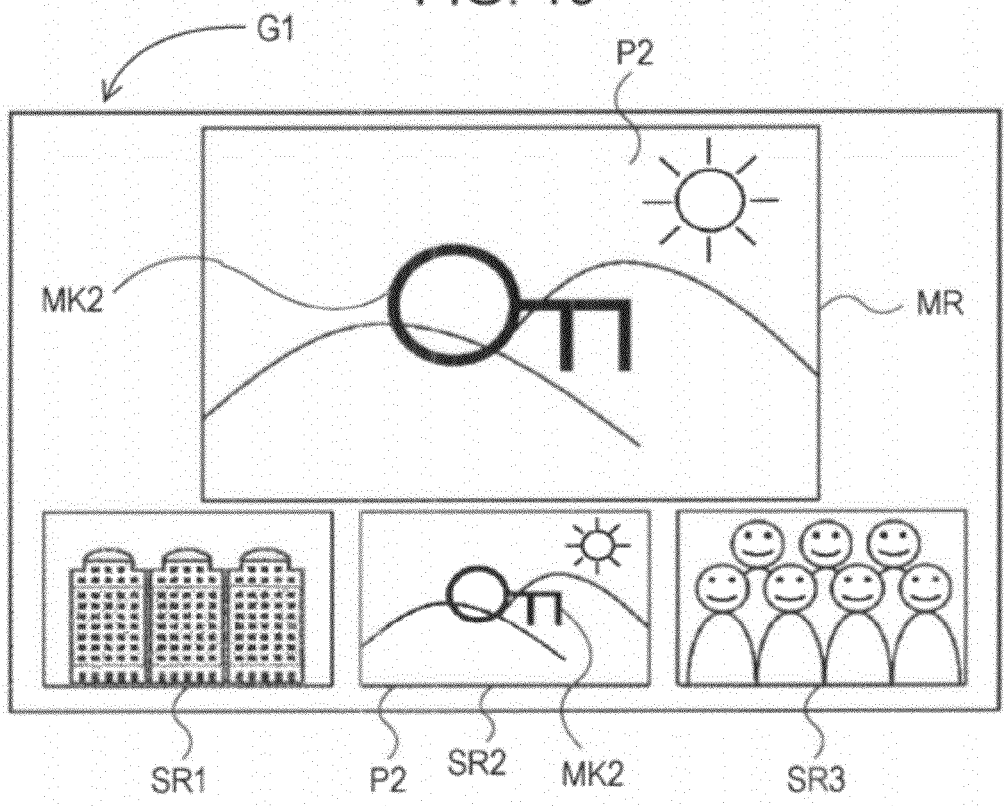
FIG. 19 is a diagram showing a playback screen obtained after the assignment of a protection mark.

In this regard, in this selective protection process, as shown in FIG. 19, a protection mark MK2 is assigned instead of the deletion mark MK1. The protection mark MK2 is a mark indicating that the image is to be protected.

Also in this display action, effects similar to those of the "selective deletion process" described above can be obtained.

In particular, the image P2 in a state of being subjected to a predetermined change (herein, the process of assigning the protection mark MK2) is displayed in a relatively large size in the primary display region MR. This facilitates confirmation of the contents of the change (in other words, confirmation of the presence of the protection mark MK2). Further, the image P2 obtained after the change is also displayed in the center secondary display region SR2. This allows confirmation of the predetermined change of the image P2 while performing comparison with remaining images. More specifically, the fact that a protection instruction has been given for the given image P2 among the plurality of images can be recognized while performing comparison (contrast) with the remaining images displayed in the respective secondary display regions SR1 to SR3.

<3-5. Print Specification Process>

Next, a case where the menu item "DPOF" (Digital Print Order Format) is selected on the menu screen GM (FIG. 6) will be exemplified.

When the menu item "DPOF" is selected, the screen G1 (see FIG. 5) is displayed again on the rear monitor 12 in place of the menu screen GM. In this regard, the print specification process (printing specification process) using DPOF, more specifically, the "selective printing specification process" of specifying that a selected image is to be printed and output and so forth, is enabled on the screen G1 obtained after the redisplay.

Figure 20:
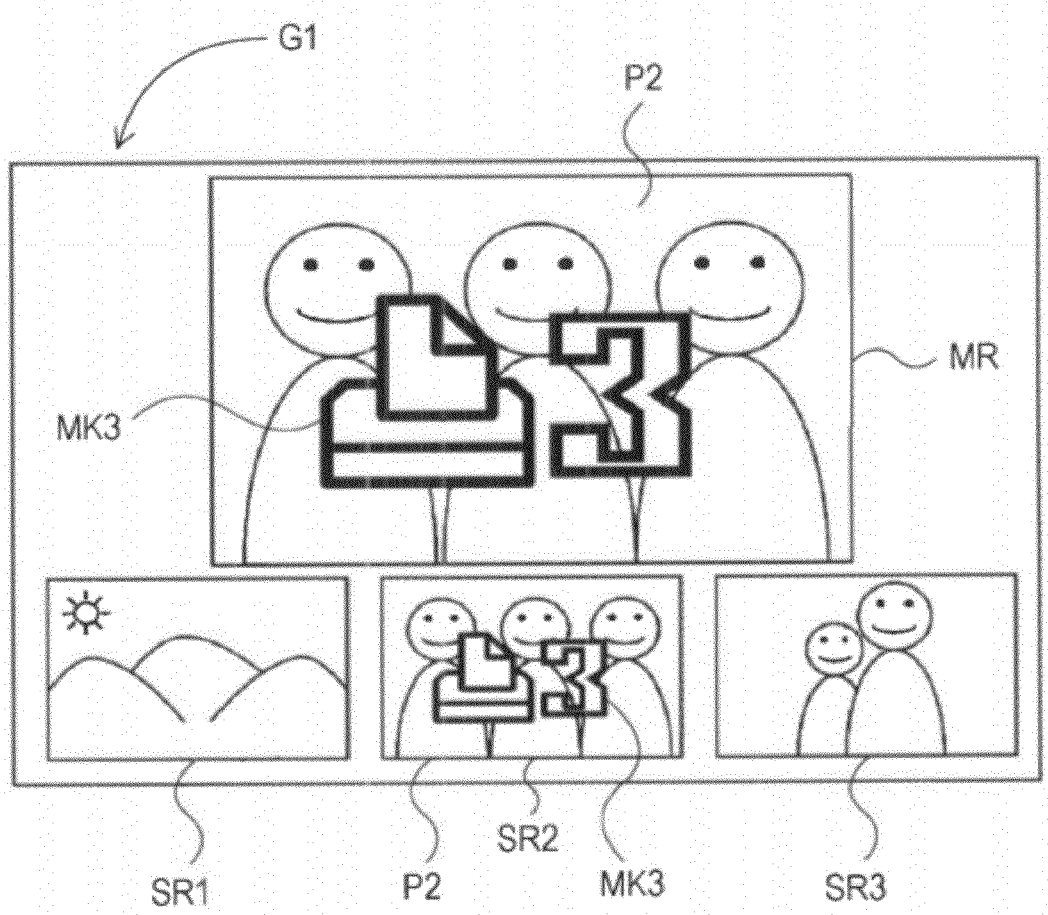
FIG. 20 is a diagram showing a playback screen obtained after the assignment of a printing specification mark.

In this printing specification process, a setting operation of increasing or decreasing the number of prints is enabled in accordance with the pressing of the up button 84U and the down button 84D. In this printing specification process, further, as shown in FIG. 20, a printing specification mark MK3 is assigned to the targeted image P2 instead of the deletion mark MK1. The printing specification mark MK3 is a mark indicating that the image is to be printed. Further, the printing specification mark MK3 also indicates the number of prints specified of the image. More specifically, a number in the mark MK3 indicates the number of prints specified of the image.

Further, the remaining action is executed in a manner similar to that of the "selective deletion process" described above.

For example, the operation of selecting a targeted image is executed involving the scrolling operation regarding the secondary display regions SR. Further, when the menu button 83A is pressed after the specification for printing has been given for one or a plurality of images, a confirmation screen GC similar to that of FIG. 18 is displayed on the rear monitor 12. And when a setting instruction is given using the confirmation screen GC, the image-capturing device 1 executes a printing specification process on the selected image (a process of specifying the number of prints, etc., for the selected image using DPOF).

Also in this display action, effects similar to those of the "selective deletion process" described above can be obtained.

In particular, the image P2 in a state of being subjected to a predetermined change (herein, the process of assigning the printing specification mark MK3) is displayed in a relatively large size in the primary display region MR. This facilitates confirmation of the contents of the change (in other words, confirmation of the presence of the printing specification mark MK3 and confirmation of the number of prints specified). Further, the image P2 obtained after the change is also displayed in the center secondary display region SR2. This allows confirmation of the predetermined change of the image P2 while performing comparison with remaining images. More specifically, the fact that the specification for printing has been given for the given image P2 among the plurality of images and the number of prints specified for the image P2 can be recognized while performing comparison (contrast) with the remaining images displayed in the respective secondary display regions SR1 to SR3.

<3-6. Secret Process>

Next, a case where the menu item "secret" is selected on the menu screen GM (FIG. 6) will be exemplified.

When the menu item "secret" is selected, the screen G1 (see FIG. 5) is displayed again on the rear monitor 12 in place of the menu screen GM. In this regard, the process of concealing a selected image so as to be in a non-display state ("secret process"), more specifically, the "selective secret process" of concealing an image selected (specified) by the operator so as to be in a non-display state, is enabled on the screen G1 obtained after the redisplay.

An action of selecting a targeted image, an action of accepting an instruction for concealing the targeted image, etc., are executed in a manner similar to that of the "selective deletion process" described above. For example, in accordance with the pressing of the center button 84C, a concealment instruction for the targeted image is given. Further, an operation of selecting a targeted image is executed involving the scrolling operation regarding the secondary display regions SR. Furthermore, when the menu button 83A is pressed after a concealment instruction has been given for one or a plurality of images, a confirmation screen GC similar to that of FIG. 18 is displayed on the rear monitor 12. Thereafter, when a setting instruction is given using the confirmation screen GC, the image-capturing device 1 executes the concealment process on the selected image in response to the setting instruction. Subsequently, the selected image is no longer displayed in the playback screen G1 on the rear monitor 12. Note that the non-display state can be canceled by accepting a separate concealment cancellation process.

Figure 21:
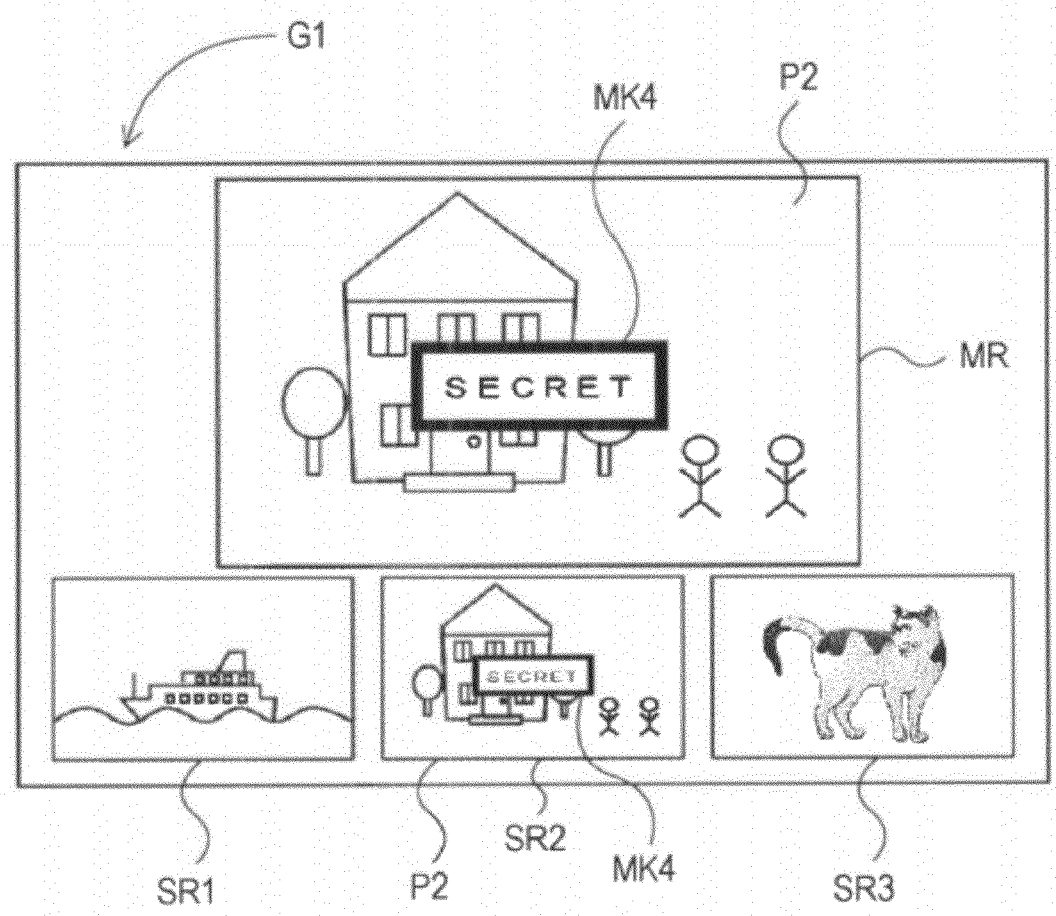
FIG. 21 is a diagram showing a playback screen obtained after the assignment of a concealment mark.

In this regard, in this selective concealment process, as shown in FIG. 21, a concealment mark MK4 is assigned instead of the deletion mark MK1. The concealment mark MK4 is a mark indicating that the image is to be concealed.

Also in this display action, effects similar to those of the "selective deletion process" described above can be obtained.

In particular, the image P2 in a state of being subjected to a predetermined change (herein, the process of assigning the concealment mark MK4) is displayed in a relatively large size in the primary display region MR. This facilitates confirmation of the contents of the change (in other words, confirmation of the presence of the concealment mark MK4). Further, the image P2 obtained after the change is also displayed in the center secondary display region SR2. This allows confirmation of the predetermined change of the image P2 while performing comparison with remaining images. More specifically, the fact that a concealment instruction has been given for the given image P2 among the plurality of images can be recognized while performing comparison (contrast) with the remaining images displayed in the respective secondary display regions SR1 to SR3.

<3-7. Image Quality Adjustment Process (Change the Brightness)>

Next, a case where the menu item "change the brightness" is selected on the menu screen GM (FIG. 6) will be exemplified.

When the menu item "change the brightness" is selected, the screen G1 (see FIG. 5) is displayed again on the rear monitor 12 in place of the menu screen GM. In this regard, the execution of the process of changing the brightness of a selected image (also referred to as a luminance changing process) is enabled on the screen G1 obtained after the redisplay.

Figure 22:
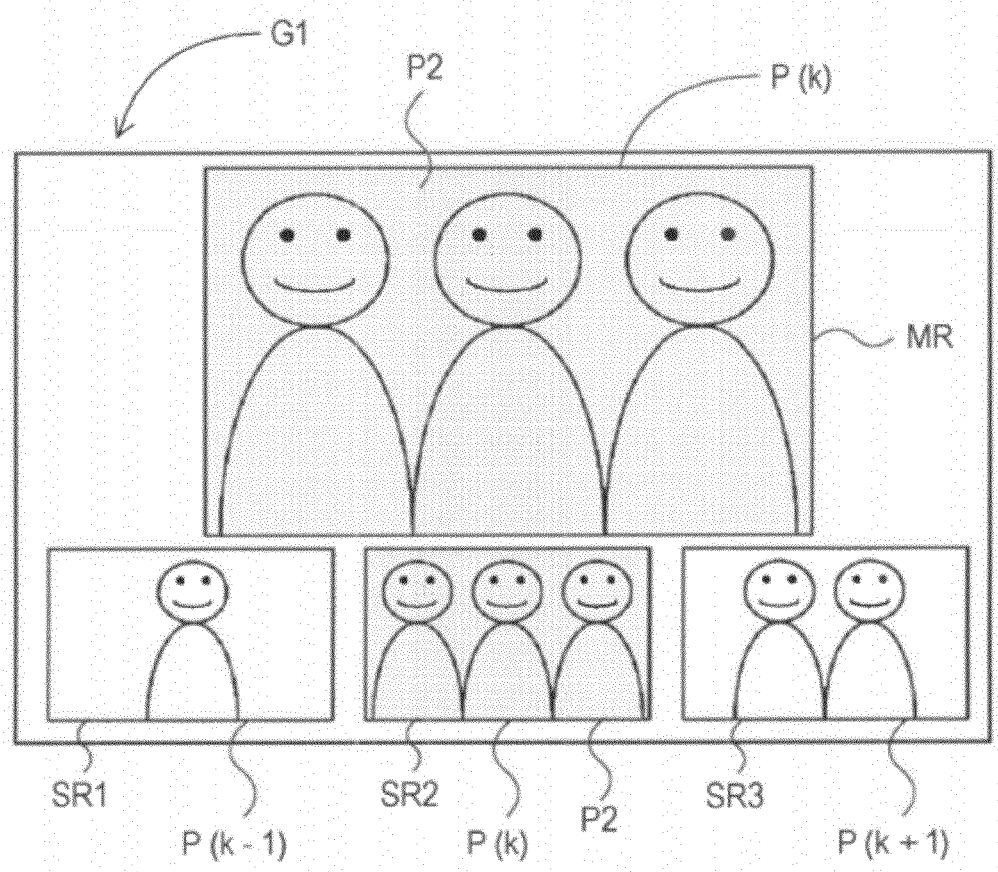
FIG. 22 is a diagram showing a playback screen obtained after a brightness change.

In this "brightness changing process", in accordance with the pressing of the up button 84U and the down button 84D, the change operation of increasing or decreasing the brightness is enabled. In the "brightness changing process", further, as shown in FIG. 22, an image quality adjustment process (brightness changing process) of increasing or decreasing the brightness is carried out on image data PM for display in the primary display region MR regarding a targeted image P(k). Further, a brightness changing process at substantially the same level is also carried out on image data PS2 for display in the secondary display region SR2 regarding the same targeted image P(k). And the targeted image P(k) is displayed in the primary display region MR using new image data PM obtained after the brightness change, and the targeted image P(k) is displayed in the secondary display region SR2 using new image data PS2 obtained after the brightness change. Further, the fact that a brightness changing instruction (deletion instruction) has been given regarding the targeted image P(k) is stored in the storage unit (a memory, etc.) of the image-capturing device 1 along with the level for the brightness change.

Further, the remaining action is executed in a manner similar to that of the "selective deletion process" described above. For example, the operation of selecting a targeted image is executed involving the scrolling operation regarding the secondary display regions SR.

Also in this display action, effects similar to those of the "selective deletion process" described above can be obtained.

In particular, the image P2 in a state of being subjected to a predetermined change (herein, the brightness changing process) is displayed in a relatively large size in the primary display region MR. This facilitates confirmation of the contents of the change (in other words, confirmation of the image obtained after the brightness change). Further, the image P2 obtained after the change is also displayed in the center secondary display region SR2. This allows confirmation of the predetermined change of the image P2 while performing comparison with remaining images. More specifically, the fact that the brightness changing process has been carried out on the given image P2 among the plurality of images can be recognized while performing comparison (contrast) with the remaining images displayed in the respective secondary display regions SR1 to SR3. Further, the image P2 obtained after the brightness change can also be visually confirmed while performing comparison (contrast) with the remaining images displayed in the respective secondary display regions SR1 to SR3.

Figure 23:
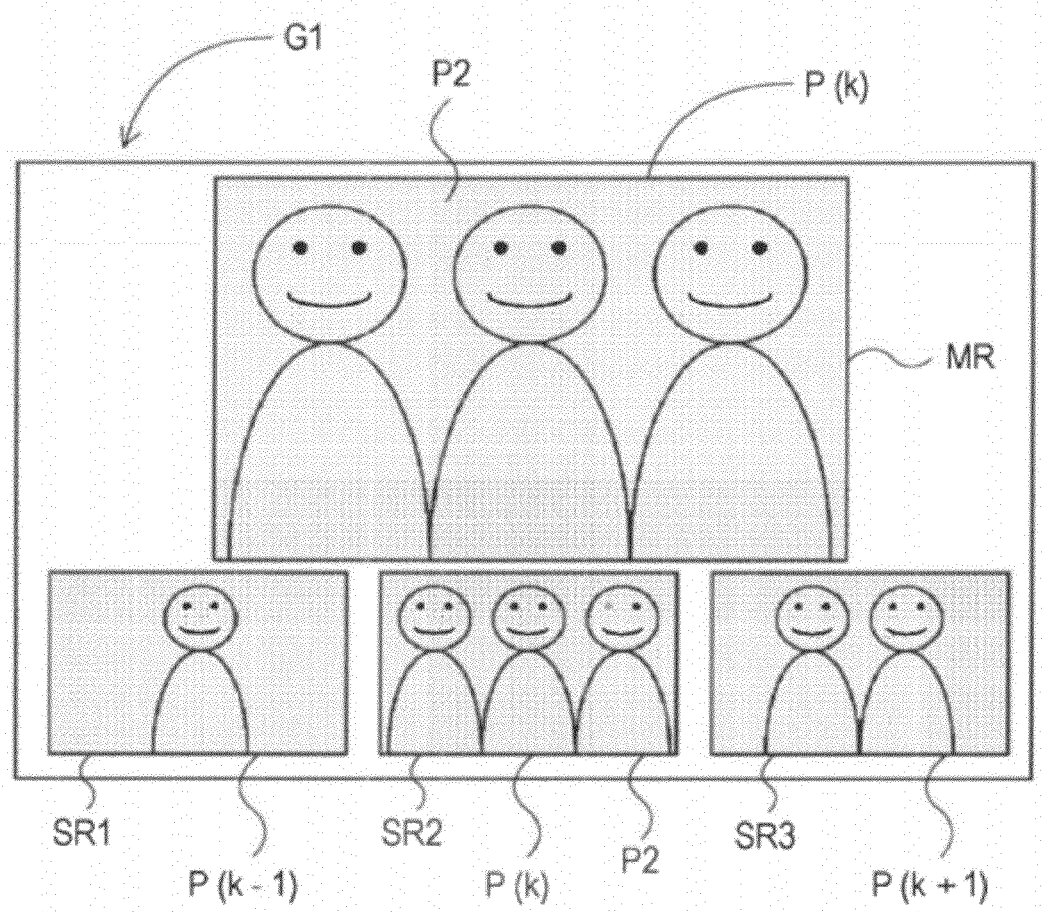
FIG. 23 is a diagram showing a playback screen obtained after a brightness change according to an exemplary modification.

Note that a case has been exemplified herein in which images are displayed in the respective secondary display regions SR (SR1 to SR3) at brightness values individually set for the respective images (see FIG. 22). However, this is not restrictive. For example, in accordance with the brightness changing operation for the primary display region MR (the operation of pressing the up button 84U and/or the down button 84D), as shown in FIG. 23, luminance-changed images on which a brightness change equivalent to a brightness change in the primary display region MR has been carried out may be displayed in all the secondary display regions SR (SR1 to SR3). A screen G1 of FIG. 23 is common to the screen G1 of FIG. 22 in that an image P(k) whose brightness has been changed at substantially the same level as that in the primary display region MR is displayed in the secondary display region SR2. On the other hand, the difference from FIG. 22 is that a brightness change at substantially the same level is also carried out on the images displayed in the remaining secondary display regions SR1 and SR3. Specifically, in the secondary display region SR1, an image P(k−1) on which a brightness change at substantially the same level as that of the brightness change for the image P(k) has been carried out is displayed. Likewise, in the secondary display region SR3, an image P(k+1) on which a brightness change at substantially the same level as that of the brightness change for the image P(k) has been carried out is displayed.

In this manner, images on which a brightness change at substantially the same level as that of the brightness change for the image P(k) displayed in the primary display region MR has been carried out are displayed in all the secondary display regions SR1 to SR3. Therefore, by viewing the images displayed in the secondary display regions SR (in particular, the secondary display regions SR1 and SR3), it can be easily confirmed how the remaining images P(k−1) and P(k+1) are to be changed when a brightness change at substantially the same level as that of the brightness change for the image P(k) displayed in the primary display region MR is carried out on the remaining images P(k−1) and P(k+1). That is, the images P(k−1) and P(k+1) obtained after the change can be easily confirmed while performing comparison and targeting with the image P(k). In other words, the plurality of images P(k−1), P(k), and P(k+1) on which an equivalent brightness change has been carried out can be simultaneously browsed in the plurality of secondary display regions SR1 to SR3.

<4. Others>

While an embodiment of this invention has been explained, this invention is not to be limited to the contents explained above.

For example, in the embodiment mentioned above, the "brightness changing process" among image quality adjustment processes has been exemplified. However, this is not restrictive, and the idea mentioned above can also be applied to other image quality adjustment processes (for example, the "contrast changing process", the "hue changing process", and the "saturation changing process", etc.).

In accordance with this, as shown in FIG. 22, the image P2 in a state of being subjected to a predetermined change (the "contrast changing process", etc.) is displayed in a relatively large size in the primary display region MR. This facilitates confirmation of the contents of the change (confirmation of an image obtained after the contrast change, etc.). Further, the image P2 obtained after the change is also displayed in the center secondary display region SR2. This allows confirmation of the predetermined change of the image P2 while performing comparison with remaining images. More specifically, the fact that an image quality adjustment process has been carried out on the given image P2 among the plurality of images can be recognized while performing comparison (contrast) also with the remaining images displayed in the respective secondary display regions SR1 to SR3.

In the embodiment mentioned above, further, the display control unit 22 controls the contents of the display on the rear monitor 12 so that the image P2 displayed in the center secondary display region SR2 among the plurality of secondary display regions SR1 to SR3 is also displayed in the primary display region MR. However, this is not restrictive, and, for example, the image P1 displayed in the leftmost-side secondary display region SR1 among the plurality of secondary display regions SR1 to SR3 may also be displayed in the primary display region MR. Note that, in this case, preferably, the primary display region MR is arranged to the left of the screen G1 of the rear monitor 12 so as to facilitate easy understanding of the correspondence between the primary display region MR and the secondary display region SR1.

In the embodiment mentioned above, further, a case has been exemplified in which the idea of the present invention is applied to an image display technique for displaying an image on the display unit (rear monitor 12) of the image-capturing device 1. However, this is not restrictive.

For example, the idea of the present invention may be applied in a case where a photographed image acquired by the image-capturing device 1 is displayed on a display unit of a computer such as a personal computer. Specifically, a program that implements the functions mentioned above may be executed using a CPU, etc., of the personal computer to display a photographed image acquired by the image-capturing device 1 on a screen similar to the screen G1 mentioned above.

Further, an image to be displayed is not limited to a photographed image, and a variety of types of images may be to be displayed.

Furthermore, the idea mentioned above may be applied when various images are displayed using an image playback-only device, etc., that do not have an image-capturing function.

The invention claimed is:

1. An image capture device, comprising:
    display means, situated on a side opposite from an image capturing lens, having a primary display region and a plurality of secondary display regions;
    display control means that controls contents of display on the display means so that a plurality of images are displayed in the plurality of secondary display regions and so that a first image which is displayed in one secondary display region among the plurality of secondary display regions is also displayed in the primary display region; and
    change means that carries out a predetermined change only on the first image, wherein
    the display control means displays the first image in a state of being subjected to the predetermined change in both of the one secondary display region and the primary display region,
    the predetermined change is applied to an immediately following image and an immediately preceding image, with respect to the first image, displayed in the plurality of secondary display regions, when a direction selection key is depressed, and
    the predetermined change includes a provisional deletion instruction for the first image that is accepted when the direction selection key is depressed and cancelled when the direction selection key is depressed again.

2. The image display device according to claim 1, wherein the predetermined change includes a change regarding rotation of an image, and the display control means displays the first image in a state of being subjected to the change regarding the rotation in both the one secondary display region and the primary display region.

3. The image display device according to claim 1, wherein the predetermined change includes a change regarding a magnification change of an image, and the display control means displays the first image in a state of being subjected to the change regarding the magnification change in both the one secondary display region and the primary display region.

4. The image display device according to claim 1, wherein the predetermined change includes a change for assigning a mark indicating an image to be deleted, and the display control means displays the first image in a state of being assigned the mark in both the one secondary display region and the primary display region.

5. The image display device according to claim 1, wherein the predetermined change includes a change for assigning a mark indicating an image to be protected, and the display control means displays the first image in a state of being assigned the mark in both the one secondary display region and the primary display region.

6. The image display device according to claim 1, wherein the predetermined change includes a change for assigning a mark regarding specification for printing of an image, and the display control means displays the first image in a state of being assigned the mark in both the one secondary display region and the primary display region.

7. The image display device according to claim 1, wherein the predetermined change includes a change for assigning a mark regarding concealment of an image, and the display control means displays the first image in a state of being assigned the mark in both the one secondary display region and the primary display region.

8. The image display device according to claim 1, wherein the predetermined change includes a change that involves an image quality adjustment process regarding at least one of a color, contrast, and brightness of an image, and the display control means displays the first image in a state of being subjected to the image quality adjustment process in both the one secondary display region and the primary display region.

9. The image display device according to claim 1, wherein the display control means displays the first image, in accordance with a scrolling operation regarding the plurality of secondary display regions, in another secondary display region which is different from the one secondary display region among the plurality of secondary display regions in the state of being subjected to the predetermined change.

10. The image display device according to claim 1, wherein the display control means displays a second image which is different from the first image in another secondary display region which is different from the one secondary display region among the plurality of secondary display regions in a state undergoing a change equivalent to the predetermined change to the first image.

11. The image display device according to claim 10, wherein the predetermined change includes a change regarding a magnification change of an image, and the display control means displays the second image in the other secondary display region in a state undergoing a magnification-changing process equivalent to a magnification change to the first image.

12. The image display device according to claim 10, wherein the predetermined change includes a change that involves an image quality adjustment process regarding at least one of a color, contrast, and brightness of an image, and the display control means displays the second image in the other secondary display region in a state undergoing the image quality adjustment process equivalent to the image quality adjustment process for the first image.

13. An image display method, implemented in an image-capturing device, comprising:

displaying, on a side opposite from an image capturing lens of the image-capturing device, a plurality of images in a plurality of secondary display regions;

controlling contents of display such that a first image, which is displayed in one secondary display region among the plurality of secondary display regions, is also displayed in a primary display region;

performing a predetermined change only on the first image and displaying the first image in a state of being subjected to the predetermined change in both of the one secondary display region and the primary display region; and applying the predetermined change to an immediately following image and an immediately preceding image, with respect to the first image, displayed in the plurality of secondary display regions, when a direction selection key is depressed, wherein the predetermined change includes a provisional deletion instruction for the first image that is accepted when the direction selection key is depressed and cancelled when the direction selection key is depressed again.

14. A non-transitory computer-readable storage medium having computer readable program codes embodied in the computer readable storage medium that, when executed cause a computer to execute:

displaying, displaying, on a side opposite from an image capturing lens of an image-capturing device, a plurality of images in a plurality of secondary display regions and displaying a first image, which is displayed in one secondary display region among the plurality of secondary display regions, in a primary display region;

performing a predetermined change only on the first image;

updating and displaying the first image in a state of being subjected to the predetermined change in both of the one secondary display region and the primary display region; and applying the predetermined change to an immediately following image and an immediately preceding image, with respect to the first image, displayed in the plurality of secondary display regions, when a direction selection key is depressed, wherein the predetermined includes a provisional deletion instruction for the first image that is accepted when the direction selection key is depressed and cancelled when the direction selection key is depressed again.

* * * * *